(12) United States Patent
Terao et al.

(10) Patent No.: US 10,203,204 B2
(45) Date of Patent: Feb. 12, 2019

(54) ROTATION ANGLE DETECTION DEVICE

(71) Applicant: PIONEER CORPORATION, Tokyo (JP)

(72) Inventors: Kyoichi Terao, Kanagawa (JP); Hideto Endo, Kanagawa (JP); Yuji Izuru, Kanagawa (JP)

(73) Assignee: PIONEER CORPORATION, Tokyo (JP)

( * ) Notice: Subject to any disclaimer, the term of this patent is extended or adjusted under 35 U.S.C. 154(b) by 188 days.

(21) Appl. No.: 15/326,789

(22) PCT Filed: Jul. 17, 2014

(86) PCT No.: PCT/JP2014/069079
§ 371 (c)(1),
(2) Date: Jan. 17, 2017

(87) PCT Pub. No.: WO2016/009535
PCT Pub. Date: Jan. 21, 2016

(65) Prior Publication Data
US 2017/0191825 A1    Jul. 6, 2017

(51) Int. Cl.
*G01B 21/22* (2006.01)
*G01B 7/30* (2006.01)
(Continued)

(52) U.S. Cl.
CPC .............. *G01B 21/22* (2013.01); *B62J 99/00* (2013.01); *B62M 3/00* (2013.01); *B62M 3/16* (2013.01);
(Continued)

(58) Field of Classification Search
CPC ............ G01B 21/22; G01B 7/30; B62M 6/45; B62M 6/50; B60L 11/007
(Continued)

(56) References Cited

U.S. PATENT DOCUMENTS 5,476,014 A * 12/1995 Lampe .................... B25B 23/14
73/862.21
6,871,413 B1 * 3/2005 Arms .................... A61B 5/1071
33/1 N
(Continued)

FOREIGN PATENT DOCUMENTS

JP      2012-011995      1/2012
JP   WO 2013/046472     4/2013
(Continued)

OTHER PUBLICATIONS

International Search Report, PCT/JP2014/069079, dated Oct. 21, 2014.

*Primary Examiner* — Christopher W Fulton
(74) *Attorney, Agent, or Firm* — Young & Thompson

(57) ABSTRACT

A first acceleration sensor is arranged on a crank mounted to a crankshaft so as to be located at a position away from the crankshaft by a distance r1, and the first acceleration sensor detects acceleration a1 in a direction parallel to a longitudinal direction of the crank. A second acceleration sensor is arranged on the crank mounted to the crankshaft so as to be located at a position away from the crankshaft by a distance r2 different from the distance r1, and the second acceleration sensor detects acceleration a2 in a direction parallel to the longitudinal direction of the crank. A measurement module control part calculates information regarding a rotation angle of the crank based on a1, a2, r1, and r2.

8 Claims, 17 Drawing Sheets

(51) Int. Cl.
  *B62M 3/00* (2006.01)
  *B62J 99/00* (2009.01)
  *B62M 3/16* (2006.01)

(52) U.S. Cl.
  CPC ........... *G01B 7/30* (2013.01); *B62J 2099/002* (2013.01); *B62J 2099/0013* (2013.01); *B62J 2099/0026* (2013.01)

(58) Field of Classification Search
  USPC .......................................... 33/1 PT, 1 N, 512
  See application file for complete search history.

(56) References Cited

U.S. PATENT DOCUMENTS

| | | | | |
|---|---|---|---|---|
| 7,233,872 | B2* | 6/2007 | Shibasaki | A61B 5/11 33/512 |
| 9,021,712 | B2* | 5/2015 | Caritu | B25J 5/00 33/503 |
| 2011/0060248 | A1* | 3/2011 | Ishida | A61B 5/1113 600/587 |
| 2013/0019700 | A1* | 1/2013 | Matsumoto | B62J 99/00 73/865.4 |
| 2013/0151195 | A1* | 6/2013 | Marinoni | G01B 7/30 702/151 |
| 2013/0205916 | A1 | 8/2013 | Kodama et al. | |
| 2014/0283622 | A1* | 9/2014 | Namiki | B62M 3/00 73/862.53 |
| 2015/0136509 | A1* | 5/2015 | Tanaka | B62M 6/50 180/206.3 |
| 2017/0247080 | A1* | 8/2017 | Tsuchizawa | B60L 7/18 |
| 2017/0297651 | A1* | 10/2017 | Tsuchizawa | B60W 10/08 |
| 2018/0050761 | A1* | 2/2018 | Tsuchizawa | B60L 11/007 |

FOREIGN PATENT DOCUMENTS

| | | |
|---|---|---|
| JP | 2014-008789 | 1/2014 |
| WO | WO 2012/053114 | 4/2012 |

\* cited by examiner

FIG. 5
FIG. 5A
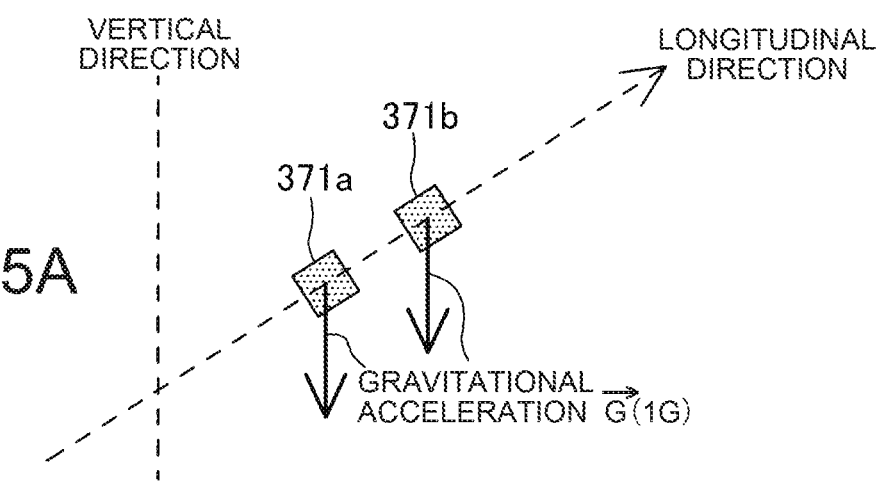
FIG. 5B
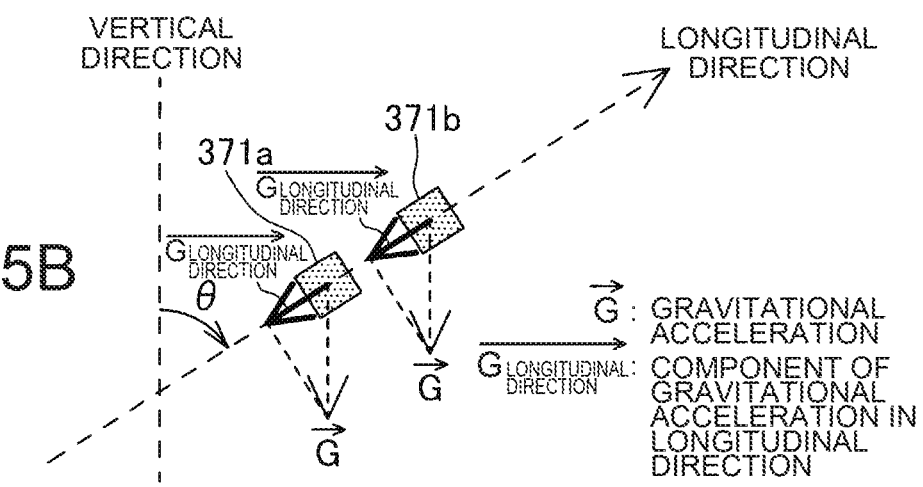

ROTATION ANGLE DETECTION DEVICE

TECHNICAL FIELD

The present invention relates to a rotation angle detection device which detects a rotation angle of a crank which rotates around a rotation shaft.

BACKGROUND ART

Conventionally, a device which is mounted to a machine driven by manpower such as a bicycle and calculates and displays information regarding driving of a bicycle, information regarding movement of a driver or the like is known. Such kind of device receives data from a sensor mounted to the bicycle and calculates, and displays predetermined information. The information to be displayed is force of the driver applied to a pedal (torque or the like).

Further, such kind of device displays the force applied to the pedal at a predetermined angular interval. Thus, it is necessary to detect an angle of a crank with respect to a reference position. For example, Patent Literature 1 discloses a device provided with a magnet group 21 in which a plurality of magnets is arranged on a circular-shaped frame-like member 20 fixed on a side surface of a frame of the bicycle at every 30° around a center C of the frame-like member 20, and a magnetic sensor 22 fixed on a chain ring and rotated together with the crank. In the device, the magnetic sensor 22 detects the angle by detecting each position of each magnet in the magnet group 21.

Further, Patent Literature 2 discloses a device which detects a rotation angle of a crank by using an angular velocity sensor 10, acceleration sensors 11, 12.

CITATION LIST

Patent Literature

Patent Literature 1: WO 2013/046472 A1
Patent Literature 2: JP 2014-008789 A

SUMMARY OF INVENTION

Technical Problem

In a rotation angle detection device disclosed in Patent Literature 1, detection accuracy of the angle is high, however a cost of the device is increased because a plurality kinds of magnet is used, namely a magnet arranged at a position which defines a reference angle is needed to have high magnetic force.

Further, in a bad environment with much dust and soil, dust or the like can easily enter into between the frame-like member 20 and the crank. Further, durability is low because ion sands or the like might be adhered to the magnet in the device.

In a pedaling state measurement device disclosed in Patent Literature 2, electricity consumption becomes large because the angular velocity sensor is used in the device. It is generally known that the electricity consumption of the angular velocity sensor is larger than that of an acceleration sensor. A device mounted to a bicycle is driven by a battery such as a cell as a power source, and therefore low electricity consumption is desired.

Accordingly, an object of the present invention is, in consideration of the problem described above, to provide a rotation angle detection device capable of, for example, achieving cost reduction, improving durability, and achieving low electricity consumption.

Solution to Problem

In order to solve the above issue, a first aspect of the present invention is a rotation angle detection device including: a first acceleration sensor which is arranged on a crank mounted to a rotation shaft or a member rotated together with the crank so as to be located at a position away from the rotation shaft by a first distance, the first acceleration sensor configured to detect first acceleration in a direction parallel to a longitudinal direction of the crank; a second acceleration sensor which is arranged on the crank or a member rotated together with the crank so as to be located at a position away from the rotation shaft by a second distance being different from the first distance, the second acceleration sensor configured to detect second acceleration in a direction parallel to the longitudinal direction of the crank; and an output part which outputs information regarding a rotation angle of the crank based on the first acceleration, the second acceleration, the first distance, and the second distance.

A second aspect of the present invention is a rotation angle detection method including: a first acceleration detection step in which a first acceleration in a direction parallel to a longitudinal direction of a crank is acquired from a first acceleration sensor arranged on the crank mounted to a rotation shaft or a member rotated together with the crank so as to be located away from the rotation shaft by a first distance; a second acceleration detection step in which a second acceleration in a direction parallel to the longitudinal direction of the crank is acquired from a second acceleration sensor arranged on the crank or a member rotated together with the crank so as to be located away from the rotation shaft by a second distance; and an output step in which information regarding a rotation angle of the crank is output based on the first acceleration, the second acceleration, the first distance, and the second distance.

A third aspect of the present invention is a rotation angle detection program that makes a computer execute the rotation angle detection method.

A fourth aspect of the present invention is a storage medium readable by a computer to store the rotation angle detection program.

BRIEF DESCRIPTION OF DRAWINGS

FIGS. 5A and 5B illustrate acceleration to be detected by the acceleration sensor when the crank is stopped.

DESCRIPTION OF EMBODIMENTS

Figure 1:
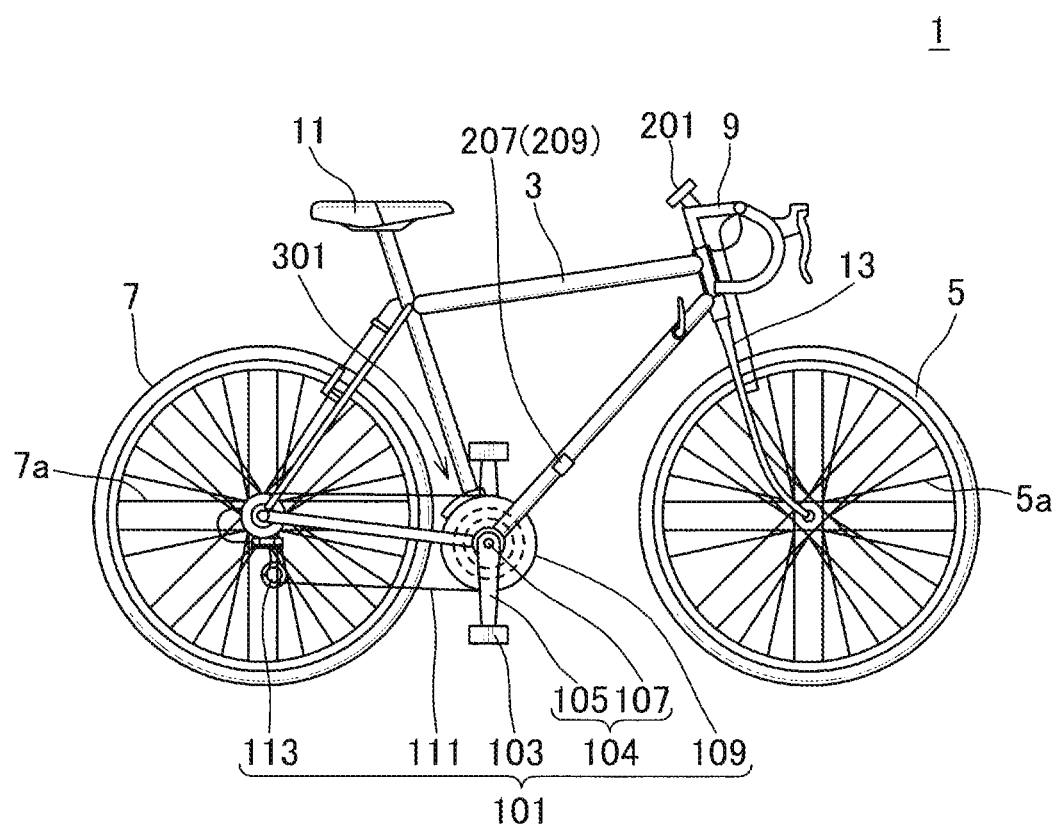
FIG. 1 illustrates a whole configuration of a bicycle having a rotation angle detection device according to a first embodiment of the present invention.

Hereinafter, a rotation angle detection device according to one embodiment of the present invention is described. In the rotation angle detection device according to one embodiment of the present invention, a first acceleration sensor is arranged on a crank mounted to a rotation shaft or a member rotated together with the crank so as to be located at a position away from the rotation shaft by a first distance and the first acceleration sensor detects first acceleration in a direction parallel to a longitudinal direction of the crank, and a second acceleration sensor is arranged on the crank or a member rotated together with the crank so as to be located at a position away from the rotation shaft by a second distance and the second acceleration sensor detects second acceleration in a direction parallel to the longitudinal direction of the crank. Further, an output part outputs information regarding a rotation angle of the crank based on the first acceleration, the second acceleration, the first distance, and the second distance. With such a configuration, a component of the gravitational acceleration of the acceleration sensor in the longitudinal direction (detection axial direction) of the crank can be calculated. Further, the information regarding the rotation angle of the crank (for example, an angle, a sine value, a cosine value or the like) is calculated based on the component of the gravitational acceleration, and thereby the rotation angle of the crank can be detected. Accordingly, a cost can be reduced because a magnet is not used, and an influence of dust or iron sands is eliminated and therefore durability can be improved. Further, low electricity consumption can be achieved because an angular velocity sensor is not used.

Further, the first distance and the second distance may be different from each other. With such a configuration, the information regarding the rotation angle of the crank can be output in a state in which the first acceleration sensor and the second acceleration sensor are arranged on one of the cranks.

Further, the output part may be formed to calculate the cosine value based on differences between a value by multiplying the second distance by the first acceleration and a value by multiplying the first distance by the second acceleration and to output the information regarding the rotation angle of the crank based on the cosine value. With such a configuration, since acceleration of centrifugal force is proportional to a distance from the center of the rotation shaft, the acceleration of the centrifugal force applied to the acceleration sensor can be cancelled based on two accelerations and the component of the gravitational acceleration in the longitudinal direction (the detection axial direction) of the crank can be calculated.

Further, a table part in which a correspondence relation between a predetermined rotation angle and the cosine value is defined in advance may be arranged, and the output part may be formed to output the information regarding the rotation angle of the crank based on the calculated cosine value and the table part. With such a configuration, it is not necessary to calculate the angle from the cosine vale, and therefore the information regarding the rotation angle of the crank can be output without executing complicated processing such as a trigonometric function processing.

Further, a crank position detection part which detects a position of the crank that in which region the crank is located among two regions of half rotation parts into which one rotation of the crank is equally divided in a vertical direction may be arranged, and the output part may be formed to output the information regarding the rotation angle of the crank based on a detection result of the crank position detection part and the cosine value. With such a configuration, in a case in which the cosine value is changed at a frequency of 180°, a range of $0°\le\theta<180°$ and a range of $180°\le\theta<360°$ can be recognized.

Further, a cosine value storing part which stores more than one cosine value calculated in the past may be arranged, and the crank position detection part may be formed to detect the position of the crank that in which region the crank is located among the two regions of the half rotation parts into which one rotation of the crank is equally divided in the vertical direction based on the cosine value stored in the cosine value storing part and a cosine value calculated at this time. With such a configuration, by determining whether the calculated cosine value is in a tendency to be increased or in a tendency to be decreased, the range of $0°\le\theta<180°$ and the range of $180°\le\theta<360°$ can be recognized.

Further, a holding part which holds information of two values mutually changed in accordance with that in which region the crank is located among the two regions of the half rotation parts into which one rotation of the crank is equally divided in the vertical direction may be arranged, and the crank position detection part may be formed to change the information held in the holding part based on the cosine value. With such a configuration, the information held in the holding part can be toggled in accordance with the cosine value. For example, the information held in the holding part is toggled between in a case in which the cosine value is "1"

and in a case in which the cosine value is "−1", and thereby the range of 0°≤θ<180° and the range of 180°≤θ<360° can be recognized.

Further, a third acceleration sensor which detects third acceleration in a direction parallel to a short direction of the crank may be arranged, and the crank position detection part may be formed to detect the position of the crank that in which region the crank is located among two regions of the half rotation parts into which one rotation of the crank is equally divided in the vertical direction based on the third acceleration. With such a configuration, the range of 0°≤θ<180° and the range of 180°≤θ<360° can be recognized based on a value of the third acceleration. Accordingly, this configuration eliminates the need for arranging a storing means such as the storing part and the holding part. Further, in a case in which a biaxial acceleration sensor is used, the number of components is not increased.

Further, a filter part which executes filter processing to one of the first acceleration and the second acceleration and the cosine value, and a delay angle correction part which executes angle correction processing after the filter processing is executed may be arranged. With such a configuration, a component of acceleration other than the gravitational acceleration due to vibration or the acceleration of the centrifugal force applied to the crank or the like can be eliminated, and therefore accuracy of the information regarding the rotation angle of the crank can be enhanced. Further, the delay generated due to the filter processing can be corrected by the delay angle correction part.

Further, a rotation angle detection method according to one embodiment of the present invention includes a first acceleration detection step in which a first acceleration in a direction parallel to a longitudinal direction of a crank is acquired from a first acceleration sensor arranged on the crank mounted to a rotation shaft or a member rotated together with the crank so as to be located away from the rotation shaft by a first distance, and a second acceleration detection step in which a second acceleration in a direction parallel to the longitudinal direction of the crank is acquired from a second acceleration sensor arranged on the crank or a member rotated together with the crank so as to be located away from the rotation shaft by a second distance. Further, in an output step, information regarding a rotation angle of the crank is output based on the first acceleration, the second acceleration, the first distance, and the second distance. With such a configuration, a component of the gravitational acceleration of the acceleration sensor in the longitudinal direction (detection axial direction) of the crank can be calculated. Further, the information regarding the rotation angle of the crank (for example, an angle, a sine value, a cosine value or the like) is calculated based on the component of the gravitational acceleration, and thereby the rotation angle of the crank can be detected. Accordingly, a cost can be reduced because a magnet is not used, and an influence of dust or iron sands is eliminated and therefore durability can be improved. Further, low electricity consumption can be achieved because an angular velocity sensor is not used.

Further, the rotation angle detection method may be served as a rotation angle detection program executed by a computer. With such a configuration, by using the computer, a component of the gravitational acceleration of the acceleration sensor in the longitudinal direction (detection axial direction) of the crank can be calculated. Further, the information regarding the rotation angle of the crank (for example, an angle, a sine value, a cosine value or the like) is calculated based on the component of the gravitational acceleration, and thereby the rotation angle of the crank can be detected. Accordingly, a cost can be reduced because a magnet is not used, and an influence of dust or iron sands is eliminated and therefore durability can be improved. Further, low electricity consumption can be achieved because an angular acceleration sensor is not used.

Further, the rotation angle detection program may be stored in a storage medium readable by a computer. With such a configuration, the program can be provided with and without mounting into a device, and version upgrading or the like of the program can be easily executed.

First Embodiment

A bicycle 1 provided with a cycle computer 201 having a rotation angle detection device according to a first embodiment of the present invention is described with reference to FIG. 1 through FIGS. 11A and 11B. As shown in FIG. 1, the bicycle 1 is provided with a frame 3, a front wheel 5, a rear wheel 7, a handle 9, a saddle 11, a front fork 13, and a driving mechanism 101.

The frame 3 is provided with two truss structures. A distal end part at a rear side of the frame 3 is rotatably connected to the rear wheel 7. Further, the front fork 13 is rotatably connected to a front side of the frame 3.

The front fork 13 is connected to the handle 9. The front fork 13 and the front wheel 5 are rotatably connected to each other at a distal end position in a downward direction of the front fork 13.

The front wheel 5 is provided with a hub part, a spoke part, and a tire part. The hub part is rotatably connected to the front fork 13. Further, the hub part and the tire part are connected by the spoke part.

The rear wheel 7 is provided with a hub part, a spoke part, and a tire part. The hub part is rotatably connected to the frame 3. Further, the hub part and the tire part are connected by the spoke part. The hub part of the rear wheel 7 is connected to a sprocket 113 described below.

The bicycle 1 is provided with the driving mechanism 101 which converts stepping force (pedaling force) by legs of a user (driver) into driving force of the bicycle 1. The driving mechanism 101 is provided with a pedal 103, a crank mechanism 104, a chain ring 109, a chain 111, and the sprocket 113.

The pedal 103 is a part which contacts with a foot of the user for pedaling. The pedal 103 is rotatably supported by a pedal crankshaft 115 of the crank mechanism 104.

Figure 2:
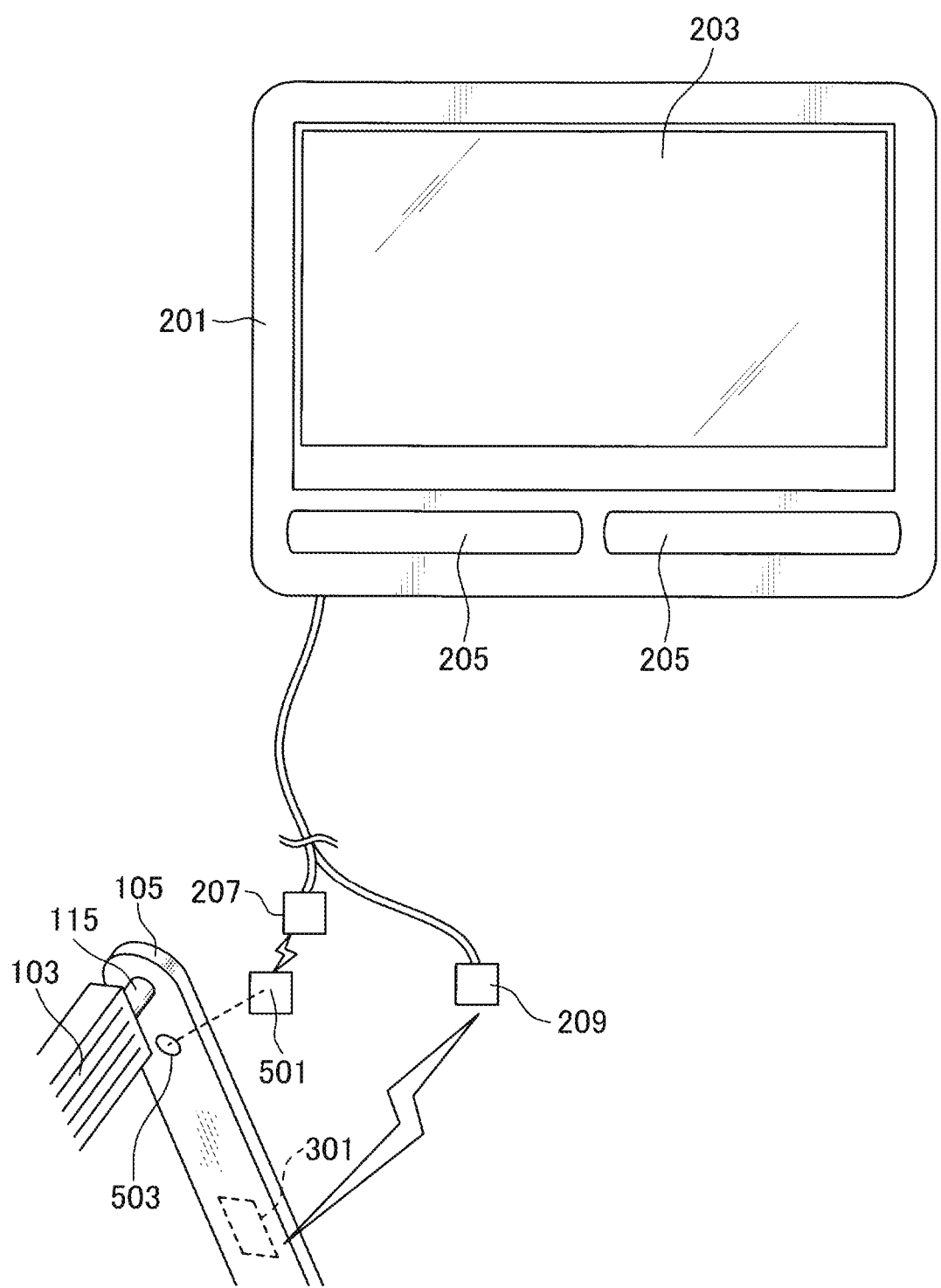
FIG. 2 illustrates a positional relationship between a cycle computer, a measurement module, and a cadence sensor shown in FIG. 1.
Figure 4:
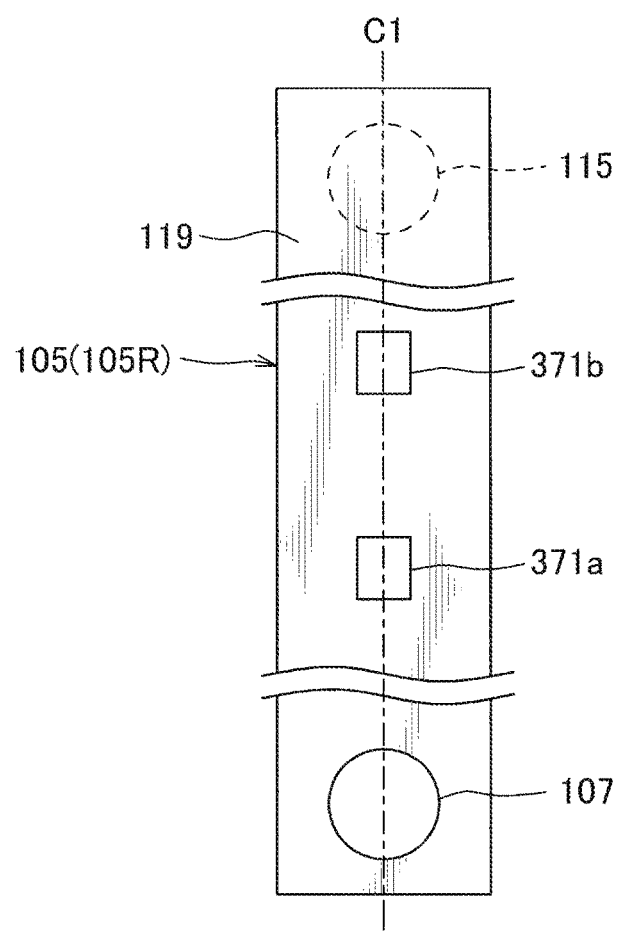
FIG. 4 illustrates an arrangement of an acceleration sensor onto a crank shown in FIG. 3.
Figure 8:
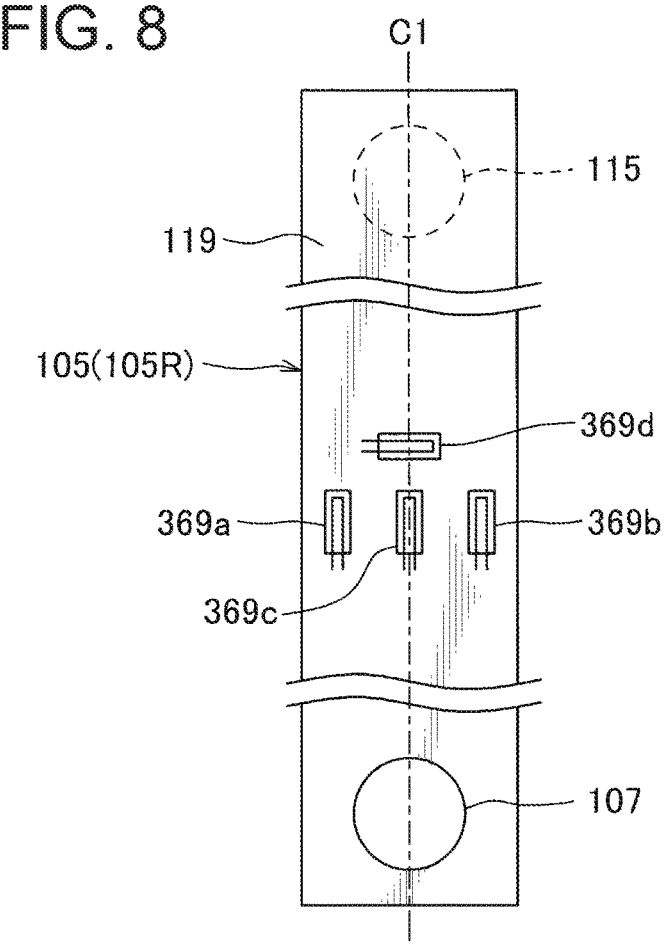
FIG. 8 illustrates an arrangement of a strain gauge onto the crank shown in FIG. 3.

The crank mechanism 104 is provided with a crank 105, a crankshaft 107, and the pedal crankshaft 115 (see FIG. 2, FIG. 4, and FIG. 8).

The crankshaft 107 is arranged to penetrate the frame 3 in a lateral direction (a one side to another side of the bicycle). The crankshaft 107 is rotatably supported by the frame 3. Namely, the crankshaft 107 is served as a rotation shaft of the crank 105.

The crank 105 is arranged to be perpendicular to the crankshaft 107. One end part of the crank 105 is connected to the crankshaft 107.

The pedal crankshaft 115 is arranged to be perpendicular to the crank 105. An axial direction of the pedal crankshaft 115 is the same as an axial direction of the crankshaft 107. The pedal crankshaft 115 is connected to another end part of the crank 105.

The crank mechanism 104 also has such a structure at another side of the bicycle 1. Namely, the crank mechanism 104 is provided with two cranks 105, and two pedal crankshafts 115. Accordingly, the pedals 103 are also arranged on both sides of the bicycle 1 respectively.

In order to distinguish these components arranged at a right side and at a left side of the bicycle 1, they are described as a right side crank 105R, a left side crank 105L, a right side pedal crankshaft 115R, a left side pedal crankshaft 115L, a right side pedal 103R, and a left side pedal 103L.

Further, the right side crank 105R and the left side crank 105L are connected to extend in opposite directions respectively with respect to the crankshaft 107 as the center. The right side pedal crankshaft 115R, the crankshaft 107, and the left side crankshaft 115L are arranged to be parallel to each other and arranged on the same plane. The right side crank 105R and the left side crank 105L are arranged to be parallel to each other and arranged on the same plane.

The chain ring 109 is connected to the crankshaft 107. The chain ring 109 is preferably formed of a variable gear capable of changing a gear ratio. Further, the chain ring 109 is engaged with the chain 111.

The chain 111 is engaged with the chain ring 109 and the sprocket 113. The sprocket 113 is connected to the rear wheel 7. The sprocket 113 is preferably formed of a variable gear.

The bicycle 1 converts the pedaling force of a user into rotation force of the rear wheel by using the driving mechanism 101.

The bicycle 1 is provided with the cycle computer 201, a measurement module 301, and a cadence sensor 501 (see also FIG. 2).

The cycle computer 201 is arranged on the handle 9. As shown in FIG. 2, the cycle computer 201 is provided with a cycle computer display part 203 which displays various information, and a cycle computer operation part 205 which receives operation of a user.

Examples of various information displayed in the cycle computer display part 203 include velocity of the bicycle 1, positional information, a distance to the destination, a predicted arrival time at the destination, a travelling distance since the departure, an elapsed time since the departure, propelling force or loss force at each angle of the crank 105, efficiency and the like.

Here, the propelling force denotes magnitude of force applied in a rotation direction of the crank 105. On the other hand, the loss force denotes magnitude of force applied in a direction different from the rotation direction of the crank 105. The force applied in the direction different from the rotation direction is useless force which does not contribute anything to driving of the bicycle 1. Accordingly, the user can drive the bicycle 1 efficiently by increasing the propelling force as much as possible and decreasing the loss force as much as possible. Namely, these forces correspond to a load applied to the crank 105 when the crank 105 is rotated.

The cycle computer operation part 205 is illustrated as a push button in FIG. 2, however it is not limited to this, and various input means such as a touch panel or combination of various input means may be utilized.

Further, the cycle computer 201 is provided with a cycle computer cadence wireless receiving part 207 and a cycle computer wireless receiving part 209. The cycle computer cadence wireless receiving part 207 and the cycle computer wireless receiving part 209 are connected to a body part of the cycle computer 201 via wirings. Further, each of the cycle computer cadence wireless receiving part 207 and the cycle computer wireless receiving part 209 is not limited to a configuration only having a receiving function. For example, each of the cycle computer cadence wireless receiving part 207 and the cycle computer wireless receiving part 209 may have a transmitting function. Hereinafter, a device described as a transmitting part or a receiving part may have both of a receiving function and a transmitting function.

Figure 3:
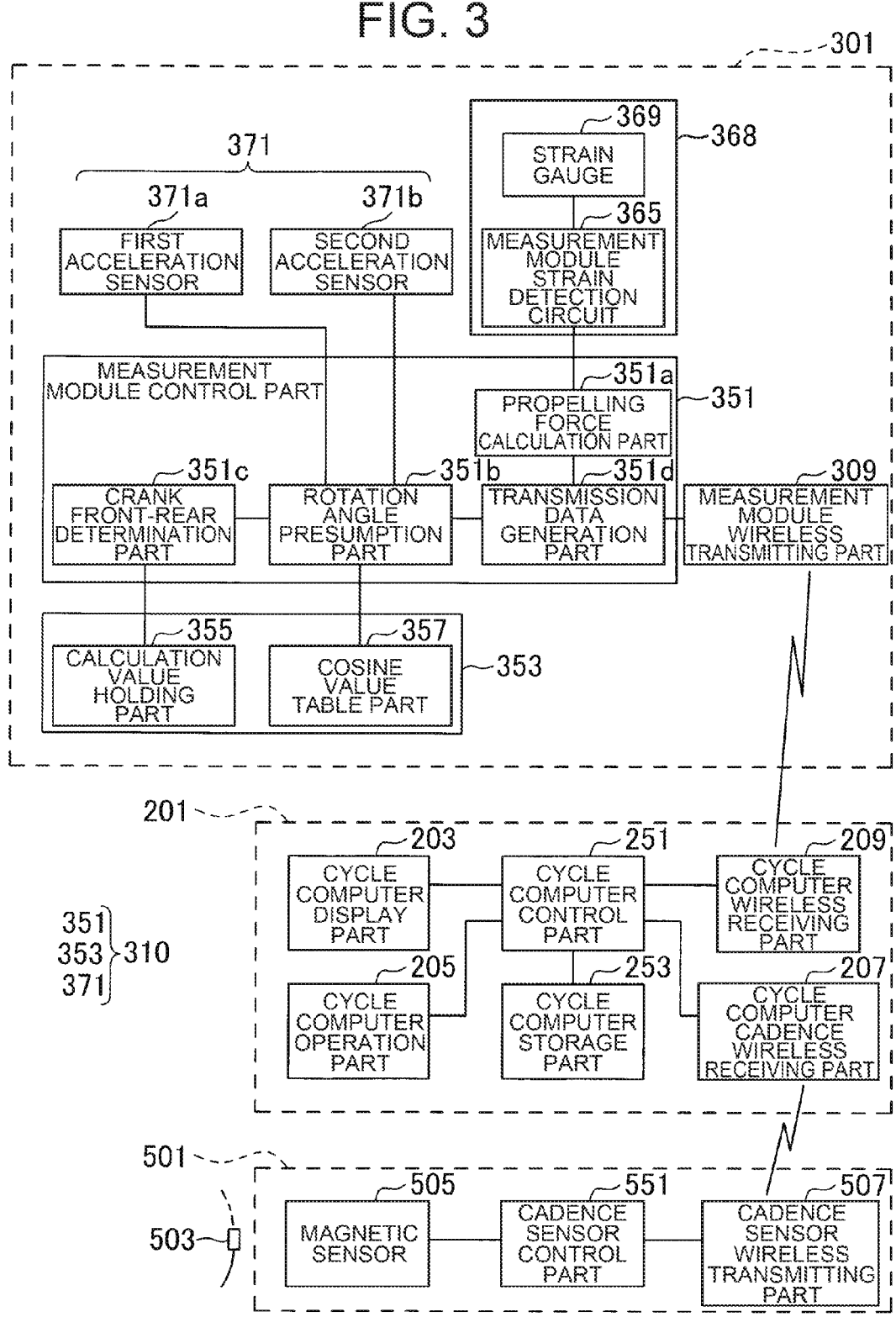
FIG. 3 illustrates a block configuration diagram of the cycle computer, the measurement module, and the cadence sensor shown in FIG. 1.

The cadence sensor 501 is provided with a magnetic sensor 505 which detects approach of a magnet 503 arranged on the crank 105 (see FIG. 3). The magnetic sensor 505 is turned ON by the approaching magnet 503 and thereby the magnetic sensor 505 detects a position of the magnet 503. Namely, when the magnetic sensor 505 is turned ON, the crank 105 is located at a position where the magnetic sensor 505 is arranged. The cycle computer 201 can acquire a cadence (rpm) from the cadence sensor 501.

The measurement module 301 is arranged, for example, on an inner surface of the crank 105. The measurement module 301 detects manpower (pedaling force) that a user applies to the pedal 103 by using a strain gauge 369 (see FIG. 3 and FIG. 8) formed of a plurality of strain gauge elements. Specifically, the measurement module 301 calculates the propelling force as the driving force of the bicycle 1 and the rotation force of the crank 105, and the loss force applied in the direction different from the rotation direction. Further, the measurement module 301 also detects the rotation angle of the crank 105 by using an acceleration sensor 371 described below.

FIG. 3 is a block diagram of the cycle computer 201, the measurement module 301, and the cadence sensor 501.

At first, a block configuration of the cadence sensor 501 is described. The cadence sensor 501 is provided with the magnetic sensor 505, a cadence sensor wireless transmitting part 507, and a cadence sensor control part 551.

The magnetic sensor 505 is turned ON or OFF by the approach of the magnet 503. Further, when the magnetic sensor 505 is turned ON, the magnetic sensor 505 outputs an information signal indicating that the magnetic sensor 505 is turned ON to the cadence sensor control part 551.

The cadence sensor wireless transmitting part 507 transmits cadence information calculated by the cadence sensor control part to the cycle computer cadence wireless receiving part 207. This transmission by the cadence sensor wireless transmitting part 507 is executed, for example, at a predetermined interval by using a timer or the like not shown.

The cadence sensor control part 551 controls the cadence sensor 501 comprehensively. When the cadence sensor control part 551 receives the output of the information signal that the magnetic sensor 505 is turned ON, the following operation is executed. The cadence sensor control part 551 refers to a counter value stored therein. Further, the cadence sensor control part 551 calculates the cadence from the counter value. Specifically, the cadence sensor control part 551 calculates a time (frequency) (second) when the magnetic sensor 505 is turned ON by multiplying the number of count (C) of the counter by a count interval (T). Further, the cadence sensor control part 551 calculates the cadence (rpm) by diving 60 by the frequency. Further, the counter may be arranged as a timer or the like at the outside of the cadence sensor control part 551.

Further, the cadence sensor control part 551 stores the cadence information in a memory not shown. Further, the cadence sensor control part 551 reads the cadence information stored in the memory and lets the cadence sensor wireless transmitting part 507 transmit the cadence information.

Next, a block configuration of the measurement module 301 is described. As shown in FIG. 3, the measurement module 301 is provided with a measurement module wireless transmitting part 309, a measurement module control part 351, a measurement module storage part 353, a power sensor 368, and an acceleration sensor 371.

The measurement module wireless transmitting part 309 transmits information of the propelling force and the loss force calculated from the strain information by the measurement module control part 351, information of the rotation angle of the crank 105 calculated from the output information of the acceleration sensor 371, or the like to the cycle computer wireless receiving part 209.

The measurement module control part 351 controls the measurement module 301 comprehensively. The measurement module control part 351 is provided with a propelling force calculation part 351*a*, a rotation angle presumption part 351*b*, a crank front-rear determination part 351*c*, and a transmission data generation part 351*d*.

The propelling force calculation part 351*a* calculates the propelling force and the loss force from the strain information output by the power sensor 368. Calculation methods for the propelling force and the loss force are described below.

The rotation angle presumption part 351*b* calculates (presumes) the rotation angle of the crank 105 calculated from the output information of the acceleration sensor 371 and controls timing when the strain information is acquired or the like. A calculation method of the rotation angle of the crank 105 is described below.

The crank front-rear determination part 351*c* determines that which position the crank 105 is located in a front side (for example, 0°≤θ<180°) or in a rear side (for example, 180°≤θ<360°) in the rotation direction of the crank 105. A determination method is described below. In the present embodiment, as the reference angle 0° (360°) is defined when a distal end of the crank 105 is directed right above, an angle is defined as 180° when the distal end of the crank 105 is directed right below. Namely, the crank front-rear determination part 351*c* is served as a crank position detection part which detects a position of the crank 105 that in which region the crank 105 is located among two regions of half rotation parts into which one rotation of the crank 105 is equally divided in a vertical direction. Further, the rotation direction in which the angle is increased in the clockwise direction or the rotation direction in which the angle is increased in the counterclockwise direction may be appropriately adopted. Namely, any configuration may be adopted as long as the position of the crank 105 is unambiguously determined.

The transmission data generation part 351*d* generates transmission data from the propelling force and the loss force calculated by the propelling force calculation part 351*a* or the rotation angle of the crank 105 calculated by the rotation angle presumption part 351*b*, and then the transmission data generation part 351*d* outputs the transmission data to the measurement module wireless transmitting part 309.

Various information is stored in the measurement module storage part 353. Examples of the various information include a control program of the measurement module control part 351, and temporary information required when the measurement module control part 351 executes the control. In addition to the aforementioned information, a cosine value holding part 355 and a cosine table part 357 are stored in the measurement module storage part 353.

The cosine value holding part 355 is formed of, for example, a RAM (Random Access Memory), and holds the cosine value calculated in the past, which is used for determining the position of the crank 105 in the crank front-rear determination part 351*c*. Namely, the cosine value holding part 355 is served as a cosine value storing part which stores more than one cosine value calculated in the past.

The cosine table part 357 is formed of, for example, a ROM (Read Only Memory), and stores a correspondence table between the rotation angle and the cosine value cos θ. Namely, the cosine table part 357 is served as a table part in which a correspondence relation between a predetermined rotation angle and the cosine value is defined in advance.

The acceleration sensor 371 is integrally adhered to the crank 105. As the acceleration sensor 371, a well-known sensor such as an electrostatic capacitance type sensor, a piezo resistance type sensor or the like may be appropriately adopted. The acceleration sensor 371 is provided with a first acceleration sensor 371*a*, and a second acceleration sensor 371*b*.

FIG. 4 illustrates an example of an arrangement of the acceleration sensor 371 onto the crank 105 according to the present embodiment. The acceleration sensor 371 is adhered to an inner surface 119 of the crank 105. The inner surface of the crank 105 is defined by a surface from which the crankshaft 107 is protruded (a surface to which the crankshaft 107 is connected) and a surface (side surface) parallel to a plane including a circle defined by rotation movement of the crank 105. Although it is not shown in FIG. 4, an outer surface 120 of the crank 105 is defined by a surface which faces an inner surface 119 and from which the pedal crankshaft 115 is protruded (a surface to which the pedal crankshaft 115 is connected), namely a surface on which the pedal 103 is rotatably arranged. A longitudinal direction of an upper surface 117 of the crank 105 is extended in the same direction as the inner surface 119 and the outer surface 120, and the upper surface 117 is defined as one of surfaces perpendicular to the inner surface 119 and the outer surface 120. A lower surface 118 of the crank 105 is defined as a surface facing the upper surface 117. Further, in the present embodiment, the acceleration sensor 371 is adhered to the inner surface 119 of the crank 105 as an example, however the acceleration sensor 371 may be adhered to the outer surface 120, the upper surface 117, or the lower surface 118, or alternatively the acceleration sensor 371 may be arranged inside the crank 105.

The first acceleration sensor 371*a* and the second acceleration sensor 371*b* are arranged such that their detection directions are parallel to the longitudinal direction of the crank 105, namely parallel to a center axis C1 of the inner surface 119, and the first acceleration sensor 371*a* and the second acceleration sensor 371*b* are arranged at different distances from each other from the center of the crankshaft 107. In the example shown in FIG. 4, the first acceleration sensor 371*a* is arranged closer to the center of the crankshaft 107 than the second acceleration sensor 371*b*. Further, the first acceleration sensor 371*a* and the second acceleration sensor 371*b* arranged such that their detection directions are parallel to the longitudinal direction of the crank 105. Namely, acceleration detected by the first acceleration sensor 371*a* corresponds to first acceleration, and acceleration detected by the second acceleration sensor 371*b* corresponds to second acceleration. Here, the first acceleration sensor 371*a* and the second acceleration sensor 371*b* may not be arranged on a single straight line as shown in FIG. 4.

A detection result of the acceleration sensor 371 is output to the measurement module control part 351. At this time, an A/D converter not shown may covert analogue information into digital information.

Here, a method for detecting the rotation angle of the crank 105 in the rotation angle presumption part 351*b* by using the acceleration sensor 371 arranged as shown in FIG. 4 is described with reference to FIGS. 5A and 5B to FIG. 7. FIGS. 5A and 5B illustrate acceleration to be detected by the acceleration sensor 371 when the crank 105 is stopped. A longitudinal direction in FIG. 5 corresponds to the longitudinal direction of the crank 105, and a direction directing to a tip of an arrow from a proximal end of the arrow indicates a direction directing to the pedal crankshaft 115 from the crankshaft 107. Further, FIGS. 5A and 5B illustrate a state in which the crank 105 is stopped at a position shifted from the vertical direction.

In FIGS. 5A and 5B, since the crank 105 is stopped, the centrifugal force is not applied, and therefore only the gravitational acceleration is detected by the acceleration sensor 371 (see FIG. 5A). However, since the detection direction of the acceleration sensor 371 is parallel to the longitudinal direction of the crank 105, practically, a component of the gravitational acceleration in the longitudinal direction is detected (see FIG. 5B). The component of the gravitational acceleration in the longitudinal direction is represented by the following formula (1). Further, the same value is detected by the first acceleration sensor 371a and the second acceleration sensor 371b.

[Formula 1]

$$\overrightarrow{G_{longitudinal\ direction}} = \vec{G} \times (-\cos\theta) \quad (1)$$

Figure 6:
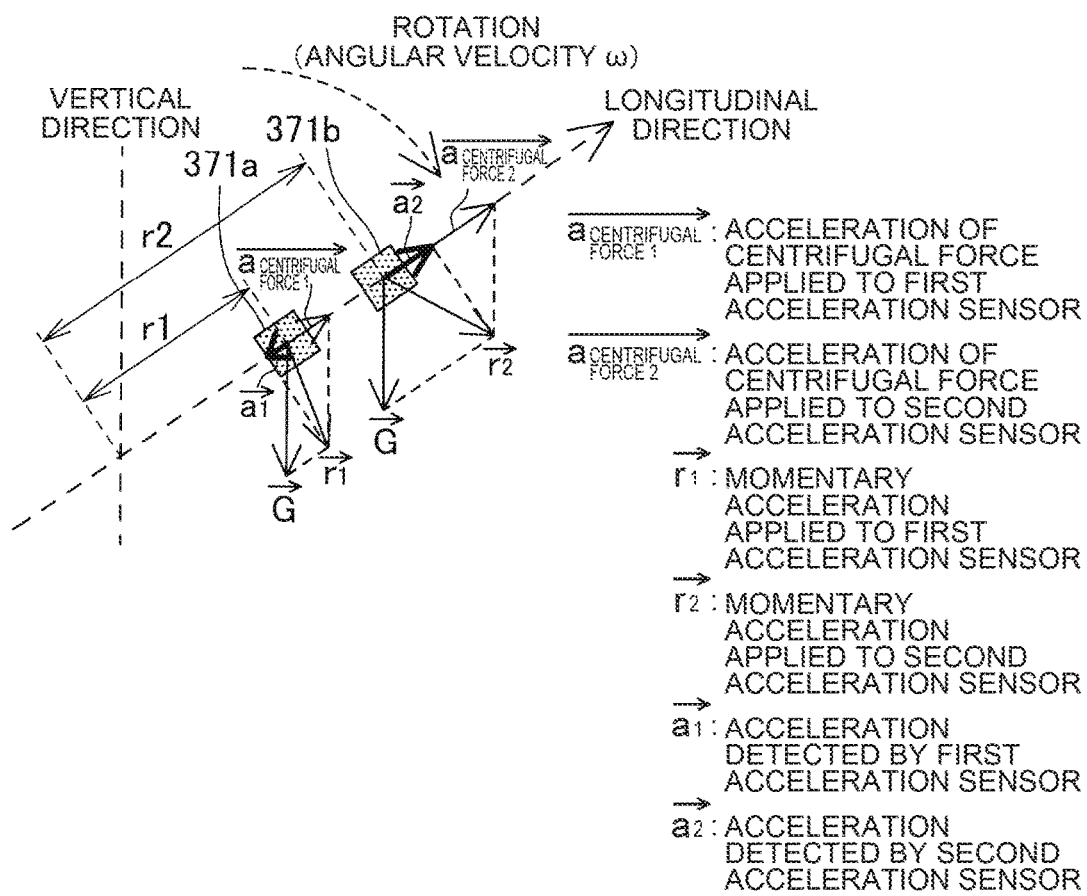
FIG. 6 illustrates the acceleration to be detected by the acceleration sensor when the crank is rotated.

Next, the crank 105 is rotated and positioned as shown in FIG. 6. Here, the first acceleration sensor 371a is arranged at a position away from the center of the crankshaft 107 by a distance r1 (first distance), and the second acceleration sensor 371b is arranged at a position away from the center of the crankshaft 107 by a distance r2 (second distance). Here, it is defined as r1<r2.

When the crank 105 is rotated, in addition to the gravitational acceleration, the centrifugal force is generated in the longitudinal direction of the crank 105 (a direction from the crankshaft 107 toward the pedal crankshaft 115, namely a normal direction of rotation of the crank 105), and therefore acceleration of the centrifugal force is applied. The acceleration of the centrifugal force at a certain position becomes larger as the position is going away from the rotation center (the center of the crankshaft 107). Further, acceleration (momentary acceleration) in which the gravitational acceleration and the acceleration of the centrifugal force are added is applied to the first acceleration sensor 371a, and acceleration (momentary acceleration) in which the gravitational acceleration and the acceleration of the centrifugal force are added is applied to the second acceleration sensor 371b. The acceleration sensor 371 is arranged such that the detection direction is parallel to the longitudinal direction of the crank 105 as described above, and practically, a component of the momentary acceleration in the longitudinal direction is detected.

In FIG. 6, as an angular velocity in rotating is defined as ω, the acceleration of the centrifugal force of the first acceleration sensor 371a is represented by the following formula (2), and the acceleration of the centrifugal force of the second acceleration sensor 371b is represented by the following formula (3)

[Formula 2]

$$|\overrightarrow{a_{centrifugalforce1}}| = r1 \times \omega^2 \quad (2)$$

[Formula 3]

$$|\overrightarrow{a_{centrifugalforce2}}| = r2 \times \omega^2 \quad (3)$$

Further, the momentary acceleration of the first acceleration sensor 371a is represented by the following formula (4), and the momentary acceleration of the second acceleration sensor 371b is represented by the following formula (5).

[Formula 4]

$$\overrightarrow{r1} = \overrightarrow{a_{centrifugalforce1}} + \vec{G} \quad (4)$$

[Formula 5]

$$\overrightarrow{r2} = \overrightarrow{a_{centrifugalforce2}} + \vec{G} \quad (5)$$

Accordingly, an output value of the first acceleration sensor 371a (the first acceleration detected by the first acceleration sensor 371a) is represented by the following formula (6), and an output value of the second acceleration sensor 371b (the second acceleration detected by the second acceleration sensor 371b) is represented by the following formula (7).

[Formula 6]

$$a1 = |\overrightarrow{a_{centrifugalforce1}}| + |\vec{G}| \times (-\cos\theta) \quad (6)$$

[Formula 7]

$$a2 = |\overrightarrow{a_{centrifugalforce2}}| - |\vec{G}| \times (-\cos\theta) \quad (7)$$

Here, the component of the acceleration of the centrifugal force can be cancelled by r2×a1−r1×a2. Namely, the following formula (8) is introduced by the formula (1) and the formulas (4) to (7).

[Formula 8]

$$r2 \times a1 - r1 \times a2 = |\overrightarrow{G_{longitudinal\ direction}}| \times (r2 - r1) \quad (8)$$

By transforming the formula (8), the gravitational acceleration in the longitudinal direction when the crank 105 is rotating is represented by the following formula (9).

[Formula 9]

$$|\overrightarrow{G_{longitudinal\ direction}}| = \frac{r2 \times a1 - r1 \times a2}{r2 - r1} \quad (9)$$

The cosine value cos θ is represented by the following formula (10) by using the formula (1) and the formula (9).

[Formula 10]

$$-\cos\theta = \frac{r2 \times a1 - r1 \times a2}{(r2 - r1) \times |\vec{G}|} \quad (10)$$

Accordingly, the rotation angle of the crank 105 can be calculated by the formula (10). Namely, −cos θ is the cosine value in the present embodiment calculated based on differences between a value multiplying the second distance (r2) by the first acceleration (a1) and a value multiplying the first distance (r1) by the second acceleration (a1).

In the present embodiment, the angle θ is not calculated directly, and the cosine table part 357 having the cosine value cos θ at predetermined angles, for example angles of every 30°, is stored in the measurement module storage part 353, and by comparing with the result calculated by the formula (10), the predetermined angle is detected. For example, as −cos θ is −1 at an angle of 0°, −cos θ is 0.866 at an angle of 30°, and −cos θ is −0.5 at an angle of 60°, in a case in which the calculation result of the formula (10) becomes (or nearly equal to) one of these values, the angle indicated by the value is detected. Namely, in the present embodiment, the rotation angle presumption part 351b is served as an output part, and the angle as the information regarding the rotation angle of the crank is output based on $-\cos\theta$ (cosine value) and the cosine table part 357 (table part). Further, as the information regarding the rotation angle of the crank, not the angle but the calculated $-\cos\theta$ as it is, or a value inverted thereof ($\cos\theta$) may be output, and then the value may be converted to the angle ($\theta$) by a part which receives the output.

Figure 7:
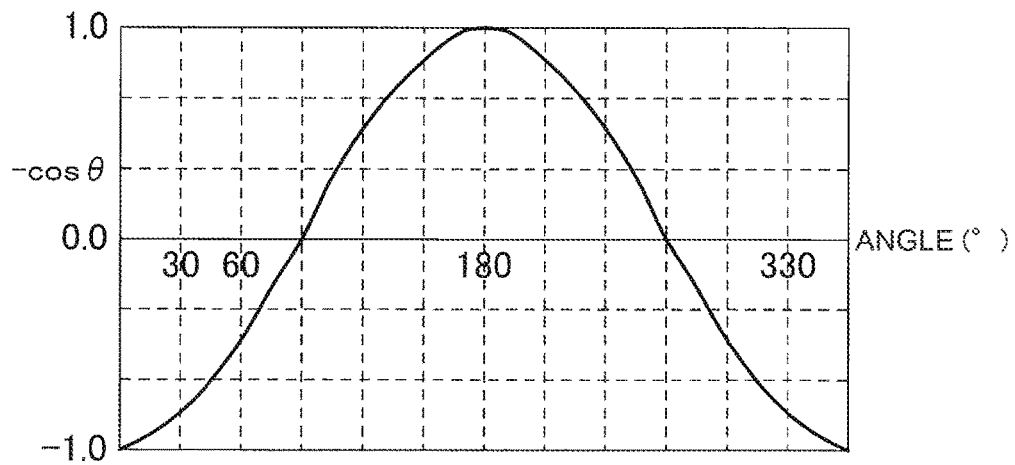
FIG. 7 is a graph illustrating a relationship between −cos θ and a rotation angle.

Here, in a case in which the cosine value $\cos\theta$ is used, the same value is indicated by an angle in a range of $0°\leq\theta<180°$ and by an angle in a range of $180°\leq\theta<360°$. Thus, the crank front-rear determination part 351c determines that in which range of $0°\leq\theta<180°$ or $180°\leq\theta<360°$ the crank is located. Specifically, as shown in FIG. 7, $-\cos\theta$ is increased in the range of $0°\leq\theta<180°$, and $-\cos\theta$ is decreased in the range of $180°\leq\theta<360°$. Thus, for example, consecutive several calculation results ($-\cos\theta$) of the formula (10) calculated in the past are held (stored) in the cosine value holding part 355 of the measurement module storage part 353, and by comparing the calculation result at this time with the calculation result in the past, the cosine value is determined whether the cosine value is in a tendency to be increased or in a tendency to be decreased, and it is determined that in which range of $0°\leq\theta<180°$ or $180°\leq\theta<360°$ the cosine value exists. Further, the rotation angle presumption part 351b identifies the angle indicated by $-\cos\theta$ calculated based on a determination result of the crank front-rear determination part 351c.

Namely, the crank front-rear determination part 351c (crank position determination part) detects that in which region the crank 105 is located among two regions of half rotation parts into which one rotation of the crank 105 is equally divided in the vertical direction based on the cosine value stored in the cosine value holding part 355 (cosine value storing part) and the cosine value calculated by the rotation angle presumption part 351b at this time.

Further, the stored cosine value may be the cosine value of only one time of the previous calculation result or the cosine value of the inconsecutive calculation result (for example, two times before). Namely, it is not limited to a specific configuration as long as the tendency to be increased or the tendency to be decreased can be determined.

Further, since a denominator of the formula (10) is constant, a value of $-\cos\theta\times K$ as K is constant may be held in a table. In this case, since division is not necessary in the calculation, a load of the calculation processing can be reduced. The value of $-\cos\theta\times K$ is also included in the cosine value of Claims. Namely, the cosine value in the present invention may include a plus/minus sign, a coefficient or the like as long as the cosine value can be represented by using $\cos\theta$.

As apparent from the aforementioned description, a rotation angle detection device 310 according to the present embodiment is provided with the measurement module control part 351 (the rotation angle presumption part 351b, the crank front-rear determination part 351c, the transmission data generation part 351d), the measurement module storage part 353 (the cosine value holding part 355, the cosine table part 357), and the acceleration sensor 371 (the first acceleration sensor 371a, the second acceleration sensor 371b).

The power sensor 368 is provided with the strain gauge 369, and a measurement module strain detection circuit 365. The strain gauge 369 is integrally adhered to the crank 105. The strain gauge 369 is provided with a first strain gauge 369a, a second strain gauge 369b, a third strain gauge 369c, and a fourth strain gauge 369d (see FIG. 8 or the like).

Further, each of terminals of the strain gauge 369 is connected to the measurement module strain detection circuit 365.

FIG. 8 illustrates an example of an arrangement of the strain gauge 369 onto the crank 105 according to the present embodiment. The strain gauge 369 is adhered to the inner surface 119 of the crank 105.

The first strain gauge 369a and the second strain gauge 369b are arranged such that detection directions are parallel to the longitudinal direction of the crank 105, namely parallel to the center axis C1 of the inner surface 119, and symmetry with respect to the center axis C1 of the inner surface 119. The third strain gauge 369c is arranged on the center axis C1 such that a detection direction is parallel to the center axis C1 and the third strain gauge 369c is interposed between the first strain gauge 369a and the second strain gauge 369b. The fourth strain gauge 369d is arranged on the center axis C1 such that a detection direction is perpendicular to the longitudinal direction of the crank 105, namely perpendicular to the center axis C1 of the inner surface 119.

Namely, a direction parallel to the center axis C1 extended in the longitudinal direction of the crank 105 (a vertical direction in FIG. 8), or a direction parallel to the longitudinal direction of the crank 105 corresponds to each of the detection directions of the first strain gauge 369a, the second strain gauge 369b, and the third strain gauge 369c, and a direction perpendicular to the center axis C1 (a lateral direction in FIG. 8), or a direction perpendicular to the longitudinal direction of the crank 105 corresponds to the detection direction of the fourth strain gauge 369d. Accordingly, each of the detection directions of the first strain gauge 369a through the third strain gauge 369c and the detection direction of the fourth strain gauge 369d are perpendicular to each other.

Further, the arrangement of the first strain gauge 369a through the fourth strain gauge 369d is not limited to the arrangement shown in FIG. 8. Namely, other aspect of the arrangement may be adopted as long as a parallel relationship and a perpendicular relationship with the center axis C1 are maintained. However, it is preferable that the first strain gauge 369a and the second strain gauge 369b are arranged in symmetry with respect to the center axis C1, and the third strain gauge 369c and the fourth strain gauge 369d are arranged on the center axis C1, because such an arrangement can detect each deformation described below precisely.

Further, in FIG. 8, the crank 105 is formed in a simple rectangular parallelepiped, however a corner part thereof may be rounded, or alternatively one of surfaces may be formed in a curved surface due to its design or the like. In such a case, by arranging the strain gauge 369 to keep the arrangement described above as much as possible, each deformation described below can be detected. However, detection accuracy is deteriorated as the relationship with the center axis C1 described above (parallel or perpendicularity) is collapsed.

The measurement module strain detection circuit 365 is connected to the first strain gauge 369a, the second strain gauge 369b, the third strain gauge 369c, and the fourth strain gauge 369d, and the measurement module strain detection circuit 365 outputs voltage as a strain amount of the strain gauge 369. The output of the measurement module strain detection circuit 365 as analogue information is converted into a strain information signal as digital information by an A/D convertor not shown. Further, the strain information signal is output to the propelling force calculation part 351a of the measurement module control part 351.

Figure 9:
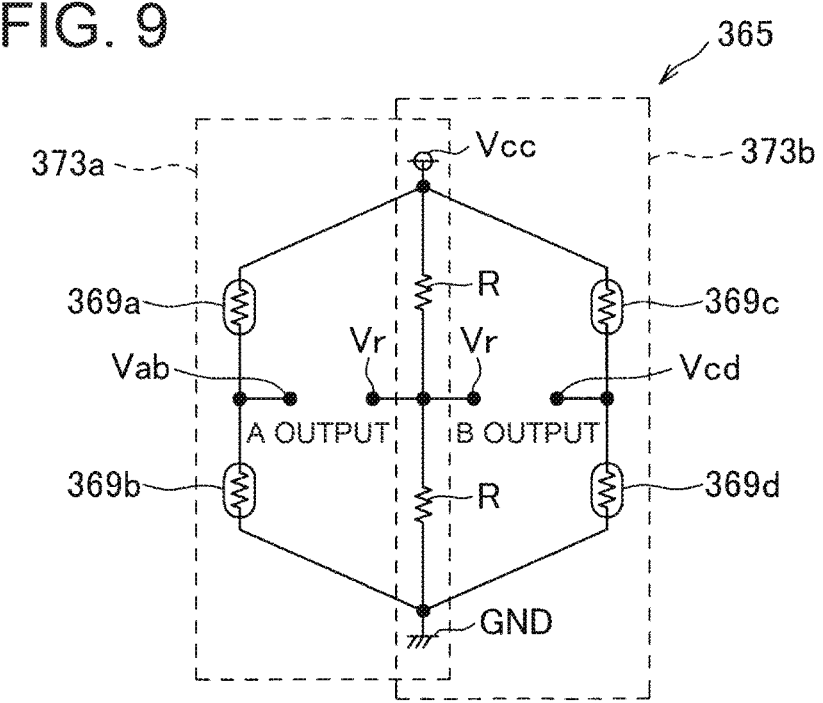
FIG. 9 illustrates a circuit diagram of a measurement module strain detection circuit shown in FIG. 3.

An example of the measurement module strain detection circuit 365 is shown in FIG. 9. The measurement module strain detection circuit 365 is provided with two bridge circuits of a first detection circuit 373a and a second detection circuit 373b. In a first system side of the first detection circuit 373a, a power source Vcc, the first strain gauge 369a, and the second strain gauge 369b are connected in this order. Namely, the first strain gauge 369a and the second strain gauge 369b are connected to the power source Vcc in series. In a second system side, the power source Vcc, a fixed resistor R, and a fixed resistor Rare connected in this order. In a first system side of the second detection circuit 373b, the power source Vcc, the third strain gauge 369c, and the fourth strain gauge 369d are connected in this order. Namely, the third strain gauge 369c and the fourth strain gauge 369d are connected to the power source Vcc in series. In a second system side, the power source Vcc, the fixed resistor R, and the fixed resistor R are connected in this order.

Namely, the two fixed resistors R are used in the first detection circuit 373a and the second detection circuit 373b in common. Here, the two fixed resistors R have the same resistance. Further, the two fixed resistors R have the same resistance as the strain gauge 369 before the compression or the extension thereof is generated. Further, the first strain gauge 369a to the fourth strain gauge 369d have the same resistance.

As it is known, the resistance of the strain gauge 369 is decreased in compression, and the resistance of the strain gauge 369 is increased in extension. The change in the resistance is proportional when a change amount is minute. Further, the detection direction of the strain gauge 369 corresponds to a direction in which a wiring is extended, and as described above, the detection directions of the first strain gauge 369a, the second strain gauge 369b, and the third strain gauge 369c are parallel to the center axis C1, and the detection direction of the fourth strain gauge 369d is perpendicular to the center axis C1. The compression or the extension is generated in a direction other than the detection direction, the resistance of the strain gauge 369 is not changed.

In the first detection circuit 373a using the strain gauge 369 having such characteristics, in a case in which the first strain gauge 369a and the second strain gauge 369b are not compressed and extended in the detection direction thereof, a potential difference between an electric potential Vab between the first strain gauge 369a and the second strain gauge 369b and an electric potential Vr between the two fixed resistors R is equal to substantially zero.

When the first strain gauge 369a is compressed and the second strain gauge 369b is extended, since the resistance of the first strain gauge 369a is decreased and the resistance of the second strain gauge 369b is increased, the electric potential Vab becomes high and the electric potential Vr does not change. Namely, the potential difference between the electric potential Vab and the electric potential Vr is generated. When the first strain gauge 369a is extended and the second strain gauge 369b is compressed, since the resistance of the first strain gauge 369a is increased and the resistance of the second strain gauge 369b is decreased, the electric potential Vab becomes low and the electric potential Vr does not change. Namely, the potential difference between the electric potential Vab and the electric potential Vr is generated.

When the first strain gauge 369a and the second strain gauge 369b are compressed, since both of the resistance of the first strain gauge 369a and the resistance of the second strain gauge 369b are decreased, the potential difference between the electric potential Vab and the electric potential Vr is equal to substantially zero. When the first strain gauge 369a and the second strain gauge 369b are extended, since both of the resistance of the first strain gauge 369a and the resistance of the second strain gauge 369b are increased, the potential difference between the electric potential Vab and the electric potential Vr is equal to substantially zero.

Operation of the second detection circuit 373b is similar to that of the first detection circuit 373a. Namely, when the third strain gauge 369c is compressed and the fourth strain gauge 369d is extended, the electric potential Vcd is increased and the electric potential Vr is decreased, and therefore the potential difference between the electric potential Vcd and the electric potential Vr is generated. When the third strain gauge 369c is extended and the fourth strain gauge 369d is compressed, the electric potential Vcd is decreased and the electric potential Vr is increased, and therefore the potential difference between the electric potential Vcd and the electric potential Vr is generated. When the third strain gauge 369c and the fourth strain gauge 369d are compressed, or when the third strain gauge 369c and the fourth strain gauge 369d are extended, the potential difference between the electric potential Vcd and the electric potential Vr is equal to substantially zero.

Thus, a connection point of the first strain gauge 369a and the second strain gauge 369b which is capable of detecting the electric potential Vab of the first detection circuit 373a, and a connection point of the two fixed resistors R which is capable of detecting the electric potential Vr are defined as output of the first detection circuit 373a (hereinafter, referred to as "A output"). A connection point of the third strain gauge 369c and the fourth strain gauge 369d which is capable of detecting the electric potential Vcd of the second detection circuit 373b, and a connection point of the two fixed resistors R which is capable of detecting the electric potential Vr are defined as output of the second detection circuit 373b (hereinafter, referred to as "B output"). The A output and the B output correspond to the strain information.

Figure 10A:
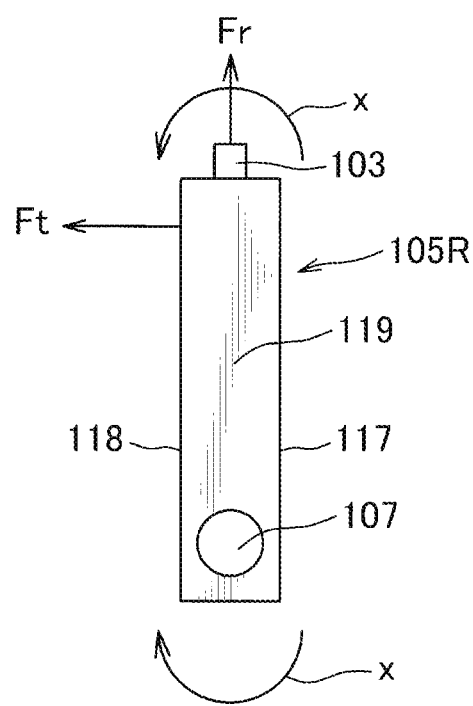
FIGS. 10A to 10C illustrate force applied to a right side crank and deformation thereof.
Figure 10B:
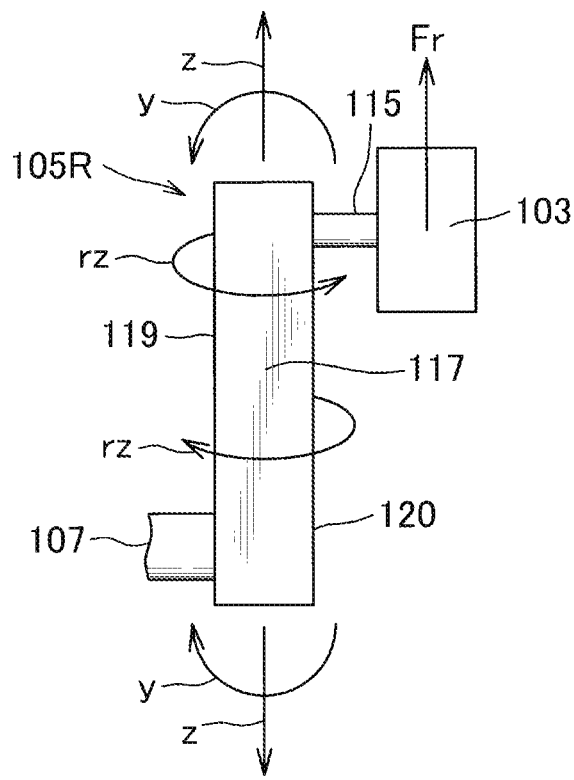
Figure 10C:
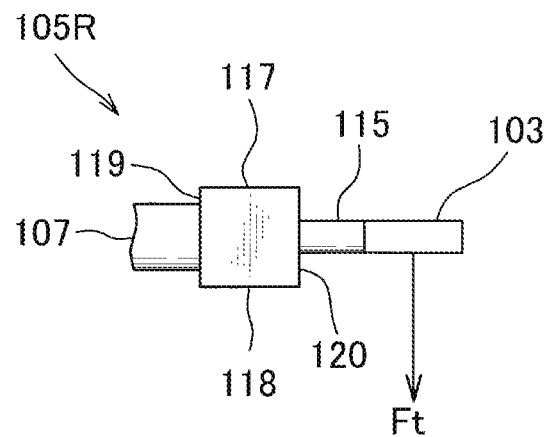

FIGS. 10A to 10C illustrate a deformation state of the right side crank 105R to which force (pedaling force) is applied by a user. FIG. 10A is a plane view seen from an upper surface 117 of the right side crank 105R. FIG. 10B is a plane view seen from the inner surface 119 of the right side crank 105R. FIG. 10C is a plane view seen from an end part of the right side crank 105R at a side of the crankshaft 107. Further, the right side crank 105R is used in the description below, however the left side crank 105L is similar.

When the pedaling force is applied from a leg of a user through the pedal 103, the pedaling force is converted into rotation force of the crank 105. The pedaling force is divided into the propelling force Ft as force in the tangent direction of the rotation of the crank 105 and the loss force Fr as force in the normal direction of the rotation of the crank 105. At this time, in the right side crank 105R, bending deformation x, bending deformation y, tensile deformation z, and torsional deformation rz are generated.

As shown in FIG. 10A, in the bending deformation x, the right side crank 105R is deformed so as to be bent from the upper surface 117 toward the lower surface 118 or from the lower surface 118 toward the upper surface 117, and this is the deformation caused by the propelling force Ft. Namely, strain (strain generated in the rotation direction of the crank 105) due to the deformation generated in the rotation direction of the crank 105 is detected, and therefore by detecting the bending deformation x, the strain in the rotation direction generated in the crank 105 can be detected. As shown in FIG. 10B, in the bending deformation y, the right side crank 105R is deformed so as to be bent from the outer surface 120 toward the inner surface 119 or from the inner surface 119 toward the outer surface 120, and this is the deformation caused by the loss force Fr. Namely, strain (strain generated in a direction perpendicular to a plane surface including a circle defined by the rotation movement of the right side crank 105R) due to the deformation generated in a direction from the outer surface 120 toward the inner surface 119 of the crank 105 or from the inner surface 119 toward the outer surface 120 of the crank 105 is detected, and therefore by detecting the bending deformation y, the strain in an inner-outer direction generated in the crank 105 can be detected.

In the tensile deformation z, the right side crank 105R is deformed so as to be extended or compressed in the longitudinal direction, and this is the deformation caused by the loss force Fr. Namely, strain (strain generated in a direction parallel to the longitudinal direction) due to the deformation generated in a direction in which the crank 105 is stretched or pressed is detected, and therefore by detecting the tensile deformation z, the strain in a tensile direction generated in the crank 105 can be detected. In the torsional deformation rz, the right side crank 105R is deformed so as to be twisted, and this is the deformation caused by the propelling force Ft. Namely, strain due to the deformation generated in a direction in which the crank 105 is twisted is detected, and therefore by detecting the torsional deformation rz, the strain in a torsional direction generated in the crank 105 can be detected. Further, in FIGS. 10A to 10C, deformation directions of the bending deformation x, the bending deformation y, the tensile deformation z, and the torsional deformation rz are indicated by arrows, however each deformation may be generated in each direction opposite to each arrows as described above.

Accordingly, in order to measure the propelling force Ft, either of the bending deformation x and the torsional deformation rz may be quantitatively detected, and in order to measure the loss force Fr, either of the bending deformation y and the tensile deformation z may be quantitatively detected.

Here, a method for detecting (measuring) the bending deformation x, the bending deformation y, the tensile deformation z, and the torsional deformation rz by the measurement module strain detection circuit 365 arranged as shown in FIG. 8 and connected to the first strain gauge 369a, the second strain gauge 369b, the third strain gauge 369c, and the fourth strain gauge 369d as shown in FIG. 9 is described.

At first, it is described how each deformation is detected (measured) in the A output of the first detection circuit 373a. In the bending deformation x, the right side crank 105R is deformed from the upper surface 117 toward the lower surface 118 or in an opposite direction. In a case in which the right side crank 105R is deformed from the upper surface 117 toward the lower surface 118, the first strain gauge 369a is compressed and therefore the resistance thereof is decreased, and the second strain gauge 369b is extended and therefore the resistance thereof is increased. Thus, the A output of the first detection circuit 373a is positive output (the electric potential Vab is high and the electric potential Vr is low). Further, in a case in which the right side crank 105R is deformed from the lower surface 118 toward the upper surface 117, the first strain gauge 369a is extended and therefore the resistance thereof is increased, and the second strain gauge 369b is compressed and therefore the resistance thereof is decreased. Thus, the A output of the first detection circuit 373a is negative output (the electric potential Vab is low and the electric potential Vr is high).

In the bending deformation y, the right side crank 105R is deformed from the outer surface 120 toward the inner surface 119 or in an opposite direction. In a case in which the right side crank 105R is deformed from the outer surface 120 toward the inner surface 119, since the first strain gauge 369a and the second strain gauge 369b are compressed, the resistances thereof are decreased. Thus, the A output of the first detection circuit 373a is equal to zero (the potential difference between the electric potential Vab and the electric potential Vr is zero). Further, in a case in which the right side crank 105R is deformed from the inner surface 119 toward the outer surface 120, since the first strain gauge 369a and the second strain gauge 369b are extended, the resistances thereof are increased. Thus, the A output of the first detection circuit 373a is equal to zero.

In the tensile deformation z, the right side crank 105R is deformed so as to be extended or compressed in the longitudinal direction. In a case in which the right side crank 105R is extended, since the first strain gauge 369a and the second strain gauge 369b are extended, the resistances thereof are increased. Thus, the A output of the first detection circuit 373a is equal to zero. Further, in a case in which the right side crank 105R is compressed, since the first strain gauge 369a and the second strain gauge 369b are compressed, the resistances thereof are decreased. Thus, the A output of the first detection circuit 373a is equal to zero.

In the torsional deformation rz, the right side crank 105R is deformed so as to be twisted. In a case in which the right side crank 105R is twisted in a direction indicated by an arrow in FIG. 10B, since the first strain gauge 369a and the second strain gauge 369b are extended, the resistances thereof are increased. Thus, the A output of the first detection circuit 373a is equal to zero. Further, in a case in which the right side crank 105R is twisted in a direction opposite to the direction indicated by the arrow in FIG. 10B, since the first strain gauge 369a and the second strain gauge 369b are extended, the resistances thereof are increased. Thus, the A output of the first detection circuit 373a is equal to zero.

As described above, only the bending deformation x is detected from the A output. Namely, the first detection circuit 373a is connected to the first strain gauge 369a and the second strain gauge 369b to detect the strain in the rotation direction generated in the crank 105.

Next, it is described how each deformation is detected (measured) in the B output of the second detection circuit 373b. In the bending deformation x, the right side crank 105R is deformed from the upper surface 117 toward the lower surface 118 or in an opposite direction. In a case in which the right side crank 105R is deformed from the upper surface 117 toward the lower surface 118, since the third strain gauge 369c and the fourth strain gauge 369d are merely bent and the third strain gauge 369c and the fourth strain gauge 369d are not compressed and extended in the detection direction, the resistances thereof is not changed. Thus, the B output of the second detection circuit 373b is equal to zero. Further, in a case in which the right side crank 105R is deformed from the lower surface 118 toward the upper surface 117, since the third strain gauge 369c and the fourth strain gauge 369d are merely bent and the third strain gauge 369c and the fourth strain gauge 369d are not compressed and extended in the detection direction, the resistances thereof is not changed. Thus, the B output of the second detection circuit 373b is equal to zero.

In the bending deformation y, the right side crank 105R is deformed from the outer surface 120 toward the inner surface 119 or in an opposite direction. In a case in which the right side crank 105R is deformed from the outer surface 120 toward the inner surface 119, the third strain gauge 369c is compressed and therefore the resistance thereof is decreased, and the fourth strain gauge 369d is extended and therefore the resistance thereof is increased. Thus, the B output of the second detection circuit 373b is positive output (the electric potential Vcd is high and the electric potential Vr is low). Further, in a case in which the right side crank 105R is deformed from the inner surface 119 toward the outer surface 120, the third strain gauge 369c is extended and therefore the resistance thereof is increased, and the fourth strain gauge 369d is compressed and therefore the resistance thereof is decreased. Thus, the B output of the second detection circuit 373b is negative output (the electric potential Vcd is low and the electric potential Vr is high).

In the tensile deformation z, the right side crank 105R is deformed so as to be extended or compressed in the longitudinal direction. In a case in which the right side crank 105R is extended, the third strain gauge 369c is extended and therefore the resistance thereof is increased, and the fourth strain gauge 369d is compressed and therefore the resistance thereof is decreased. Thus, the B output of the second detection circuit 373b is the negative output. Further, in a case in which the right side crank 105R is compressed, the third strain gauge 369c is compressed and therefore the resistance thereof is decreased, and the fourth strain gauge 369d is extended and therefore the resistance thereof is increased. Thus, the B output of the second detection circuit 373b is the positive output.

In the torsional deformation rz, the right side crank 105R is deformed so as to be twisted. In a case in which the right side crank 105R is twisted in the direction indicated by the arrow in FIG. 10B, the third strain gauge 369c is extended and therefore the resistance thereof is increased, and the fourth strain gauge 369d is not deformed in the detection direction and therefore the resistances thereof is not changed. Thus, the B output of the second detection circuit 373b is the negative output. Further, in a case in which the right side crank 105R is twisted in the direction opposite to the direction indicated by the arrow in FIG. 10B, the third strain gauge 369c is extended and therefore the resistance thereof is increased, and the fourth strain gauge 369d is not deformed in the detection direction and therefore the resistances thereof is not changed. Thus, the B output of the second detection circuit 373b is the negative output.

As described above, the bending deformation y, the tensile deformation z, and the torsional deformation rz are detected from the B output. Namely, the second detection circuit 373b is connected to the third strain gauge 369c and the fourth strain gauge 369d to detect the strain in the inner-outer direction or the strain in the tensile direction generated in the crank 105.

Further, based on the A output of the first detection circuit 373a and the B output of the second detection circuit 373b, the propelling force calculation part 351a calculate the propelling force Ft by the following formula (11) and the loss force Fr by the following formula (12). Further, the tensile deformation z is excessively small compared to the bending deformation y, and the tensile deformation z can be ignored. Namely, the values calculated from the following formula (11) and formula (12) correspond to loads applied to the crank 105 when the crank 105 is rotated.

[Formula 11]

$$Ft = p(A-A0) + q(B-B0) [\text{kgf}] \tag{11}$$

[Formula 12]

$$Fr = s|A-A0| + u(B-B0) [\text{kgf}] \tag{12}$$

Here, A denotes a value of the A output when the propelling force Ft (or the loss force Fr) is calculated, A0 denotes a value of the A output in a no load state, B denotes a value of the B output when the propelling force Ft (or the loss force Fr) is calculated, B0 denotes a value of the B output in the no load state, and p, q, s, u are coefficients calculated from simultaneous equations of the following formulas (13) to (16).

[Formula 13]

$$m = p(Am-A0) + q(Be-B0) \tag{13}$$

[Formula 14]

$$0 = s(Am-A0) + u(Be-B0) \tag{14}$$

[Formula 15]

$$0 = p(Ae-A0) + q(Bm-B0) \tag{15}$$

[Formula 16]

$$m = s(Ae-A0) + u(Bm-B0) \tag{16}$$

Here, Am denotes a value of the A output when the angle of the crank 105 is directed in a horizontally frontward direction (the crank 105 is arranged so as to be horizontal and extended in a direction of the front wheel 5) and m (kg) is applied to the pedal 103. Be denotes a value of the B output when the angle of the crank 105 is directed in the horizontally frontward direction and m (kg) is applied to the pedal 103. Ae denotes a value of the A output when the angle of the crank 105 is directed in a vertically downward direction (the crank 105 is arranged so as to be vertical and extended in a direction of the ground) and m (kg) is applied to the pedal 103. Bm denotes a value of the B output when the angle of the crank 105 is directed in the vertically downward direction and m (kg) is applied to the pedal 103.

The coefficients p, q, s, u and A0, B0 can be calculated or measured in advance, and therefore by substituting A and B for the formula (11), the propelling force Ft can be calculated.

Further, in the formula (11), the A output is corrected by using the B output. In the formula (12), the B output is corrected by using the A output. With this, an influence of the strain other than the target strain included in the first detection circuit 373a and the second detection circuit 373b can be eliminated. Further, in a case in which there is no deviation in a crank direction (a direction parallel to the center axis C1) between the first strain gauge 369a and the second strain gauge 369b, Ae=A0 is fulfilled, and therefore the correction by the B output is not necessary.

Further, an arrangement of the strain gauge 369 or a configuration of the bridge circuit is not limited to the configurations shown in FIG. 8 and FIG. 9. For example, the number of the strain gauges 369 is not limited to four, and the number of the bridge circuits is not limited to one. Namely, a configuration capable of calculating the propelling force Ft and the loss force Fr may be adopted.

Next, a block configuration of the cycle computer 201 is described. As shown in FIG. 3, the cycle computer 201 is provided with the cycle computer display part 203, the cycle computer operation part 205, the cycle computer cadence wireless receiving part 207, the cycle computer wireless receiving part 209, a cycle computer storage part 253, and a cycle computer control part 251.

The cycle computer display part 203 displays various information based on an instruction or the like of a user. In the present embodiment, the propelling force Ft and the loss force Fr are displayed in a visible manner. Further, as a method for being visible, various methods may be adopted, for example the propelling force Ft and the loss force Fr at each angle of 30° of the rotation angle of the crank 105 can be displayed as vectors based on the rotation angle of the crank 105 transmitted from the measurement module 301. Further, as other methods, for example, a graphic display, a color coding display, a sign display, a three dimensional display or the like may be adopted. Further, a combination thereof may be adopted.

The cycle computer operation part 205 receives the instruction (input) of a user. For example, the cycle computer operation part 205 receives the instruction from the user regarding display contents to be displayed on the cycle computer display part 203.

The cycle computer cadence wireless receiving part 207 receives the cadence information transmitted from the cadence sensor 501.

The cycle computer wireless receiving part 209 receives the transmission data (the propelling force Ft, the loss force Fr, and the rotation angle of the crank 105) transmitted from the measurement module 301.

The cycle computer storage part 253 stores various information. Examples of the various information include a control program of the cycle computer control part 251, and temporary information required when the cycle computer control part 251 executes the control. Further, the cycle computer storage part 253 is provided with a RAM and a ROM. The control program, various parameters, coefficients for converting the propelling force Ft and the loss force Fr into data displayed visibly in the cycle computer display part 203, and the like are stored in the ROM.

The cycle computer control part 251 controls the cycle computer 201 comprehensively. Further, the cycle computer control part 251 may control the cadence sensor 501 and the measurement module 301 comprehensively. The cycle computer control part 251 converts the propelling force Ft and the loss force Fr into the data displayed visibly in the cycle computer display part 203.

Figure 11A:
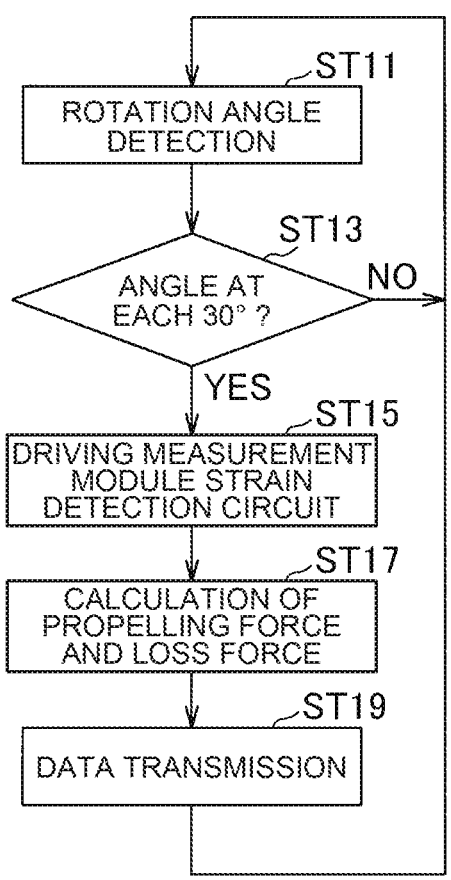
FIGS. 11A and 11B are flowcharts illustrating processing of the measurement module and the cycle computer shown in FIG. 3.
Figure 11B:
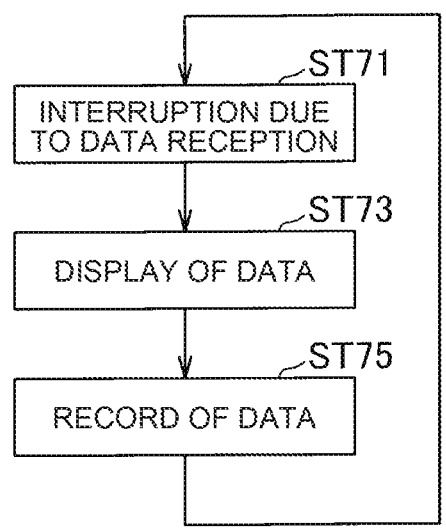

Next, processing of the measurement module 301 and the cycle computer 201 is described with reference to FIGS. 11A and 11B. The processing shown in FIGS. 11A and 11B may be executed by software (computer program) executed by a CPU embedded in the measurement module control part 351 or the cycle computer control part 251 or the processing may be executed by hardware. At first, the processing of the measurement module 301 is shown in FIG. 11A. In step ST11, the values detected by the first acceleration sensor 371a and the second acceleration sensor 371b are acquired. Further, $-\cos\theta$ (or $-\cos\theta \times K$) is calculated by the formula (10), and the range of $0° \leq \theta < 180°$ or the range of $180° \leq \theta < 360°$ is identified from the calculated value and the several numbers of preceding $-\cos\theta$ held in the cosine value holding part 355, and the rotation angle is detected. Further, in this step, the calculated value of $-\cos\theta$ is stored in the cosine value holding part 355, and when the number of storing data reaches the upper limit, the oldest value of $-\cos\theta$ is deleted. Namely, step ST11 is served as a first acceleration detection step, a second acceleration detection step, and an output step.

Next, in step ST13, it is determined whether the rotation angle detected in step ST11 corresponds to an angle of every 30°, and in a case in which the rotation angle corresponds to the angle of every 30° (in case of YES), the processing proceeds to step ST15, otherwise the processing returns to step ST11. Whether the rotation angle corresponds to the angle of every 30° can be determined by comparing the calculated $-\cos\theta$ with the value in the cosine table part 357, and in a case in which the calculated $-\cos\theta$ is matches with the value in the table, the angle indicated by the table is detected, and thereby it can be determined. Further, in the present embodiment, the angle of every 30° is defined, however other angle such as every 45° or the like may be adopted.

Next, in step ST15, the measurement module strain detection circuit 365 is driven. Namely, power source voltage is applied to the bridge circuit as shown in FIG. 9 to be a state in which measurement by the strain gauge 369 is possible.

Next, in step ST17, the propelling force Ft and the loss force Fr are calculated based on output (the A output, the B output) from the measurement module strain detection circuit 365.

Next, in step ST19, the transmission data generation part 351d transmits the calculated propelling force Ft, the loss force Fr, and the rotation angle as the transmission data via the measurement module wireless transmitting part 309. The transmitted propelling force Ft, the loss force Fr, and the rotation angle are received by the cycle computer wireless receiving part 209 of the cycle computer 201.

Further, the cycle computer control part 251 of the cycle computer 201 executes the processing shown in FIG. 12B. In step ST71, when the cycle computer control part 251 receives the propelling force Ft, the loss force Fr, the rotation angle or the cadence information, interruption processing is executed. Namely, when the cycle computer control part 251 detects that the cycle computer wireless receiving part 209 receives the propelling force Ft, the loss force Fr, the rotation angle or the cadence information, the cycle computer control part 251 stops (interrupts) the ongoing processing and starts the processing after step ST73.

Next, in step ST73, the cycle computer control part 251 displays the propelling force Ft, the loss force Fr, the cadence by each rotation angle in the cycle computer display part 203. The cycle computer display part 203 displays vectors of the propelling force Ft and the loss force Fr by each rotation angle of the crank 105, or displays a numerical value of the cadence.

For example, each magnitude of the propelling force Ft and the loss force Fr by a predetermined rotation angle (30°) of the crank 105 is shown by using an arrow or the like.

Next, in step ST75, the cycle computer control part 251 stores the propelling force Ft, the loss force Fr and the cadence information in the cycle computer storage part 253 of the cycle computer storage part 253. Then, the cycle computer control part 251 executes other processing until the interruption processing in step ST51 is executed again.

According to the present embodiment, the first acceleration sensor 371a is arranged on the crank 105 mounted to the crankshaft 107 at a position away from the center of the crankshaft 107 by the distance r1, and the first acceleration sensor 371a detects the acceleration a1 in a direction parallel to the longitudinal direction of the crank 105. The second acceleration sensor 371b is arranged on the crank 105 mounted to the crankshaft 107 at a position away from the center of the crankshaft 107 by the distance r2 different from the distance r1, and the second acceleration sensor 371b detects the acceleration a2 in the direction parallel to the longitudinal direction of the crank 105. Further, the measurement module control part 351 (the rotation angle presumption part 351b) calculates the information ($-\cos\theta$, $-\cos\theta \times K$, or the like) regarding the rotation angle of the crank 105 based on a1, a2, r1, and r2. With such a configuration, a component of the gravitational acceleration in the longitudinal direction (the detection axial direction) of the crank 105 of the acceleration sensor can be calculated. Further, by calculating the information regarding the rotation angle of the crank 105 based on the component of the gravitational acceleration, the rotation angle of the crank 105 can be detected. Accordingly, a cost can be reduced because a magnet is not used for detecting the angle, and an influence of dust or iron sands is eliminated and therefore durability can be improved.

Further, low electricity consumption can be achieved because an angular velocity sensor is not used. The angular sensor such as a gyro sensor always vibrates a vibrator and therefore the electricity consumption of the angular velocity sensor is generally larger than that of the acceleration sensor. Accordingly, as in the present embodiment, by detecting the rotation angle by only using the acceleration sensor 371, the electricity consumption can be reduced, and a driving time period of a battery or the like can be extended.

Further, since the power sensor 368 is driven in accordance with the detected rotation angles at each angle of 30°, the driving period of the power sensor 368 is restricted, and therefore the electricity consumption can be further reduced.

Further, the measurement module control part 351 outputs the information regarding the rotation angle of the crank based on the calculated value of r2×a1−r1×a2. With such a configuration, since the acceleration of the centrifugal force is proportional to the distance from the center of the rotation shaft, the acceleration of the centrifugal force applied to the acceleration sensor is cancelled based on the two acceleration a1, a2 and the component of the gravitational acceleration in the longitudinal direction (the detection axial direction) of the crank 105 can be calculated.

Further, the value of −cos θ or −cos θ×K at each angle 30° is stored as the cosine table part 357 in the measurement module storage part 353, and the measurement module control part 351 (the rotation angle presumption part 351b) outputs the rotation angle of the crank 105 based on the cosine table part 357 and the cosine value. This configuration eliminates the need for calculating the angle from the cosine value, and therefore the rotation angle of the crank 105 can be output without executing complicated processing such as a trigonometric function processing.

Further, the cosine value holding part 355 stores more than one value of −cos θ or −cos θ×K calculated in the past, and the measurement module control part 351 (the crank front-rear determination part 351c) detects that in which region the crank is located among the two regions of the half rotation parts into which one rotation of the crank 105 is equally divided in the vertical direction by comparing the value of −cos θ or −cos θ×K stored in the cosine value holding part 355 with the value of −cos θ or −cos θ×K calculated at this time. Further, the measurement module control part 351 (the rotation angle presumption part 351b) outputs the information regarding the rotation angle of the crank 105 based on the detection result described above and the value of −cos θ or −cos θ×K calculated at this time. With such a configuration, by determining whether −cos θ or −cos θ×K is in a tendency to be increased or in a tendency to be decreased, the range of 0°≤θ<180° and the range of 180°≤θ<360° can be recognized.

Further, in the embodiment described above, the rotation angle of the crank 105 is acquired by using the table based on the calculated −cos θ or −cos θ×K, however the rotation angle may be calculated without using the cosine table part 357.

Further, in the embodiment described above, the first acceleration sensor 371a and the second acceleration sensor 371b are arranged on one of the cranks 105, however the acceleration sensors may be arranged on both of the cranks 105, namely the acceleration sensors may be arranged on the crank 105R and the crank 105L, respectively. In this case, the absolute value of the distance between each of the acceleration sensors and the crankshaft 107 may be the same distance. Further, the distance from the crankshaft 107 in one crank may be represented by a positive value, and the distance from the crankshaft 107 in another crank may be represented by a negative value. Further, the measurement value a (a1 or a2) of the acceleration sensor on the crank in which the distance is represented by a negative value may be multiplied by a negative value (−1).

Second Embodiment

Figure 12:
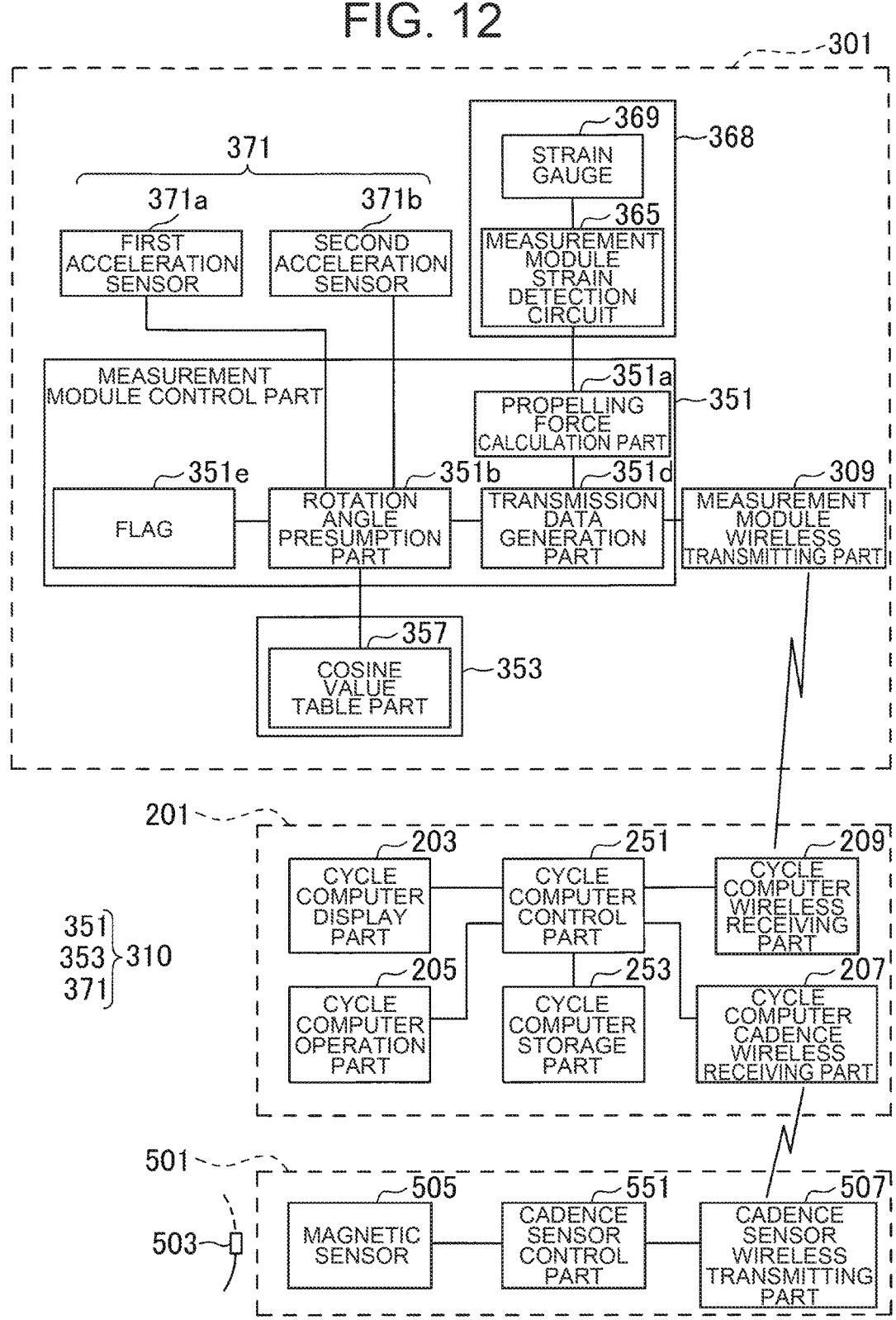
FIG. 12 illustrates a block configuration diagram of a cycle computer, a measurement module, and a cadence sensor according to a second embodiment of the present invention.

Next, a rotation angle detection device according to a second embodiment of the present invention is described with reference to FIG. 12 and FIG. 13. Further, the same numeral reference is assigned to the same part as the first embodiment described above, and the description thereof is therefore omitted.

In the present embodiment, a method for determining that in which range of 0°≤θ<180° or 180°≤θ<360° a cosine value cos θ exists is different. In the present embodiment, a flag 351e of one bit (see FIG. 12) which is toggled when a value of −cos θ becomes −1 (0°) and 1 (180°) is arranged in a measurement module control part 351. Further, the flag 351e may be formed of an element such as a register or a RAM capable of holding a value. Namely, the flag 351e is served as a holding part which holds information of two values mutually changed in accordance with that in which region a crank 105 is located among the two regions of the half rotation parts into which one rotation of the crank 105 is equally divided in a vertical direction.

Figure 13:
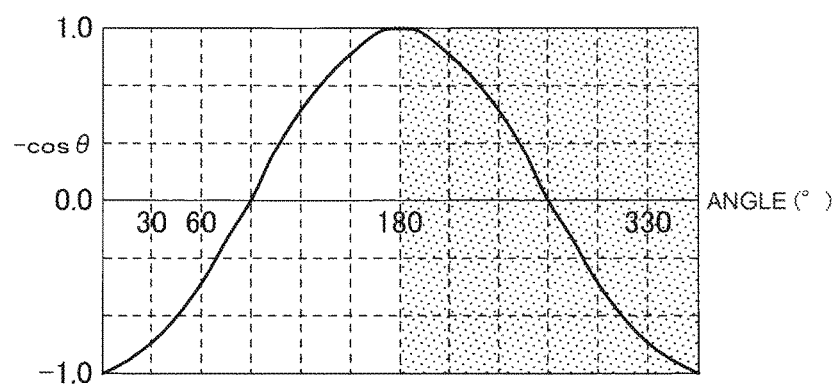
FIG. 13 illustrates change of a flag shown in FIG. 12.

For example, in a range without hatching in FIG. 13, the flag 351e is set to "0", and in a range with hatching, the flag is set to "1", and by referring the flag 351e, it can be determined that in which range of 0°≤θ<180° or 180°≤θ<360° the cosine value cos θ exists.

According to the present embodiment, the flag 351e which is toggled between "0" and "1" in accordance with that in which range of 0°≤θ<180° or 180°≤θ<360° among one rotation of the crank 105 the crank 105 is located is arranged. Further, the measurement module control part 351 (the rotation angle presumption part 351b) may toggle the flag 351e based on the calculated value of −cos θ or −cos θ×K, and the rotation angle presumption part 351b may output the rotation angle of the crank 105 based on the flag 351e and the cosine value. With such a configuration, since the value held as the flag 351e is toggled in accordance with the cosine value, the range of 0°≤θ<180° and the range of 180°≤θ<360° can be recognized. Further, since the flag 351e can be recognized by only one bit, it is not necessary to store the value of −cos θ in the past and therefore a capacity of a memory or the like can be saved.

As apparent from the aforementioned description, in the present embodiment, the rotation angle presumption part 351b is served as a crank position detection part which changes the information held in the flag 351e (holding part) based on the cosine value.

Further, regarding an initial value of the flag 351e, for example, when it is detected that a distal end of the crank 105 (the pedal crankshaft 115) is directed right above (namely 0°) from operation by a user or the like, the flag may be initialized to "0", and thereafter toggle operation may be executed.

Third Embodiment

Figure 14:
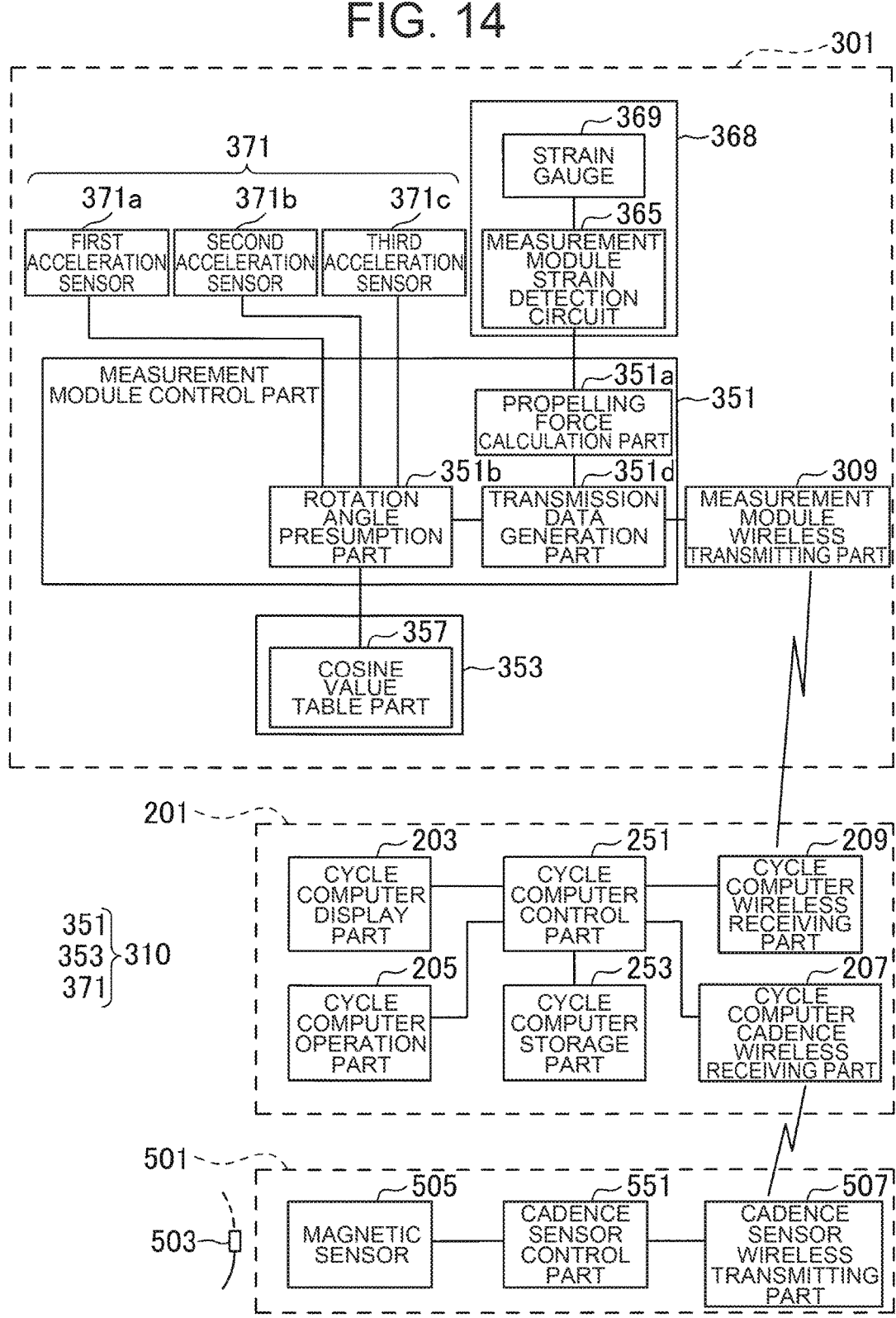
FIG. 14 illustrates a block configuration diagram of a cycle computer, a measurement module, and a cadence sensor according to a third embodiment of the present invention.
Figure 15:
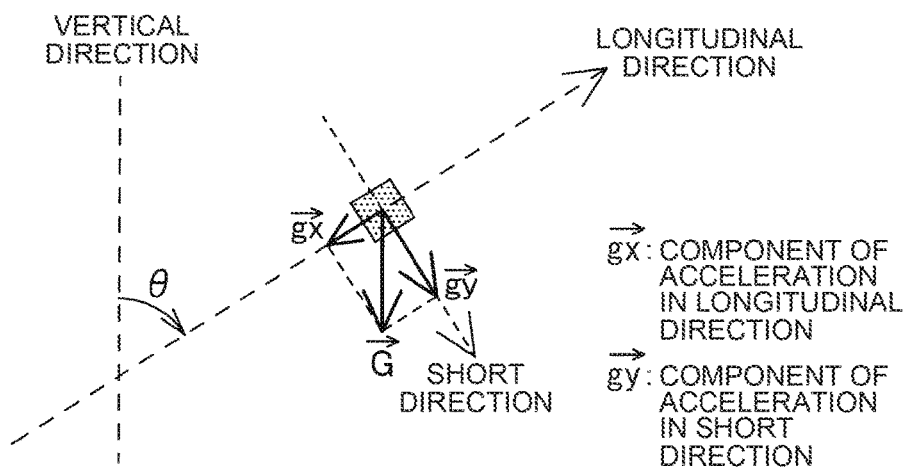
FIG. 15 illustrates a relationship between acceleration in a longitudinal direction and acceleration in a short direction of a crank.

Next, a rotation angle detection device according to a third embodiment of the present invention is described with reference to FIG. 14 to FIG. 16. Further, the same numeral reference is assigned to the same part as the first embodiment described above, and the description thereof is therefore omitted.

In the present embodiment, a method for determining that in which range of 0°≤θ<180° or 180°≤θ<360° a cosine value cos θ exists is different. In the present embodiment, in addition to a first acceleration sensor 371a and a second acceleration sensor 371b, a third acceleration sensor 371c is added (see FIG. 14). The third acceleration sensor 371c is different from the first acceleration sensor 371a and the second acceleration sensor 371b, and a detection direction of the third acceleration sensor 371c is defined by a direction (a tangent direction of rotation of the crank 105) parallel to a short direction of the crank 105. Further, the third acceleration sensor 371c may not be arranged as an independent sensor, and one of the first acceleration sensor 371a and the second acceleration sensor 371b may be formed by a biaxial acceleration sensor.

When the acceleration sensor 371 is arranged as described above, the first acceleration sensor 371a and the second acceleration sensor 371b detect the acceleration in the longitudinal direction of the crank 105, and the third acceleration sensor 371c detects the acceleration in the short direction of the crank 105. FIG. 15 illustrates an example of the gravitational acceleration G. As shown in FIG. 15, the component of the acceleration in the longitudinal direction can be detected by the first acceleration sensor 371a and the second acceleration sensor 371b, and the component of the acceleration in the short direction can be detected by the third acceleration sensor 371c.

Figure 16:
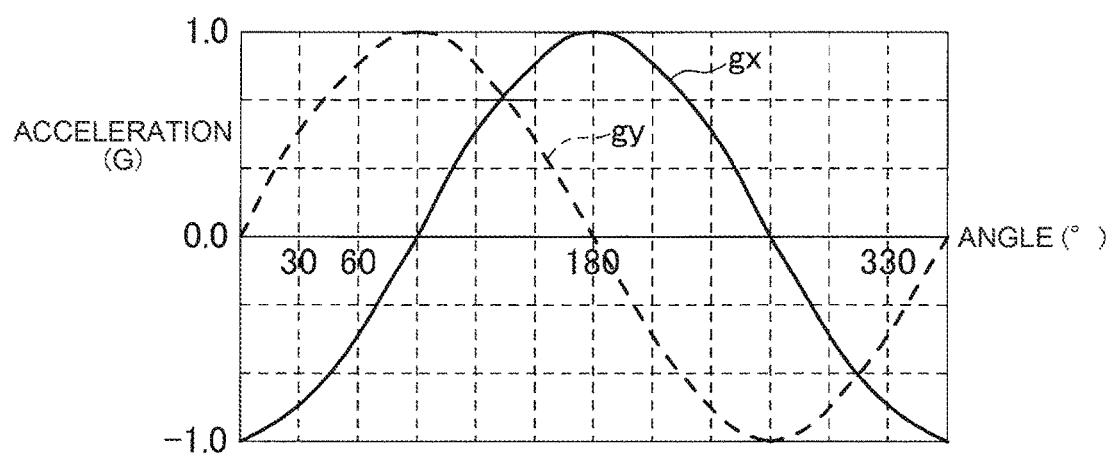
FIG. 16 is a graph illustrating a relationship between the acceleration in the longitudinal direction and the acceleration in the short direction of the crank, and a rotation angle of the crank.

A relationship between the detection values (output values of the acceleration sensors) of these accelerations and the rotation angle of the crank 105 is shown in a graph in FIG. 16. According to this graph, the acceleration in the short direction in the range of 0°≤θ<180° is a positive value, and the acceleration in the short direction in the range of 180°≤θ<360° is a negative value. Accordingly, the rotation angle presumption part 351b refers to the acceleration in the short direction, namely the output value of the third acceleration sensor 371c, and thereby it can be determined that in which range of 0°≤θ<180° or 180°≤θ<360° the cosine value cos θ exists.

The acceleration in the short direction is determined by the component of the gravitational acceleration and the component of the rotational acceleration of the crank (0 m/s² in constant rotation speed, plus value in accelerating, and minus value in decelerating), however for example in a case in which the crank in a bicycle is rotated, since the component of the gravitational acceleration occupies a lot of parts, the determination described above becomes possible.

According to the present embodiment, the third acceleration sensor which detects the third acceleration as the acceleration in a direction parallel to the short direction of the crank 105 is arranged, and the measurement module control part 351 (the rotation angle presumption part 351b) detects that in which range of 0°≤θ<180° or 180°≤θ<360° among one rotation of the crank 105 the crank 105 is located based on the third acceleration. Further, the measurement module control part 351 outputs the rotation angle of the crank 105 based on the detection result and the value of −cos θ or the like. With such a configuration, the range of 0°≤θ<180° and the range of 180°≤θ<360° can be recognized by the value of the third acceleration. Accordingly, a storage means or the like is not necessary. Further, by using the biaxial acceleration sensor, the number of components is not increased.

Fourth Embodiment

Figure 17:
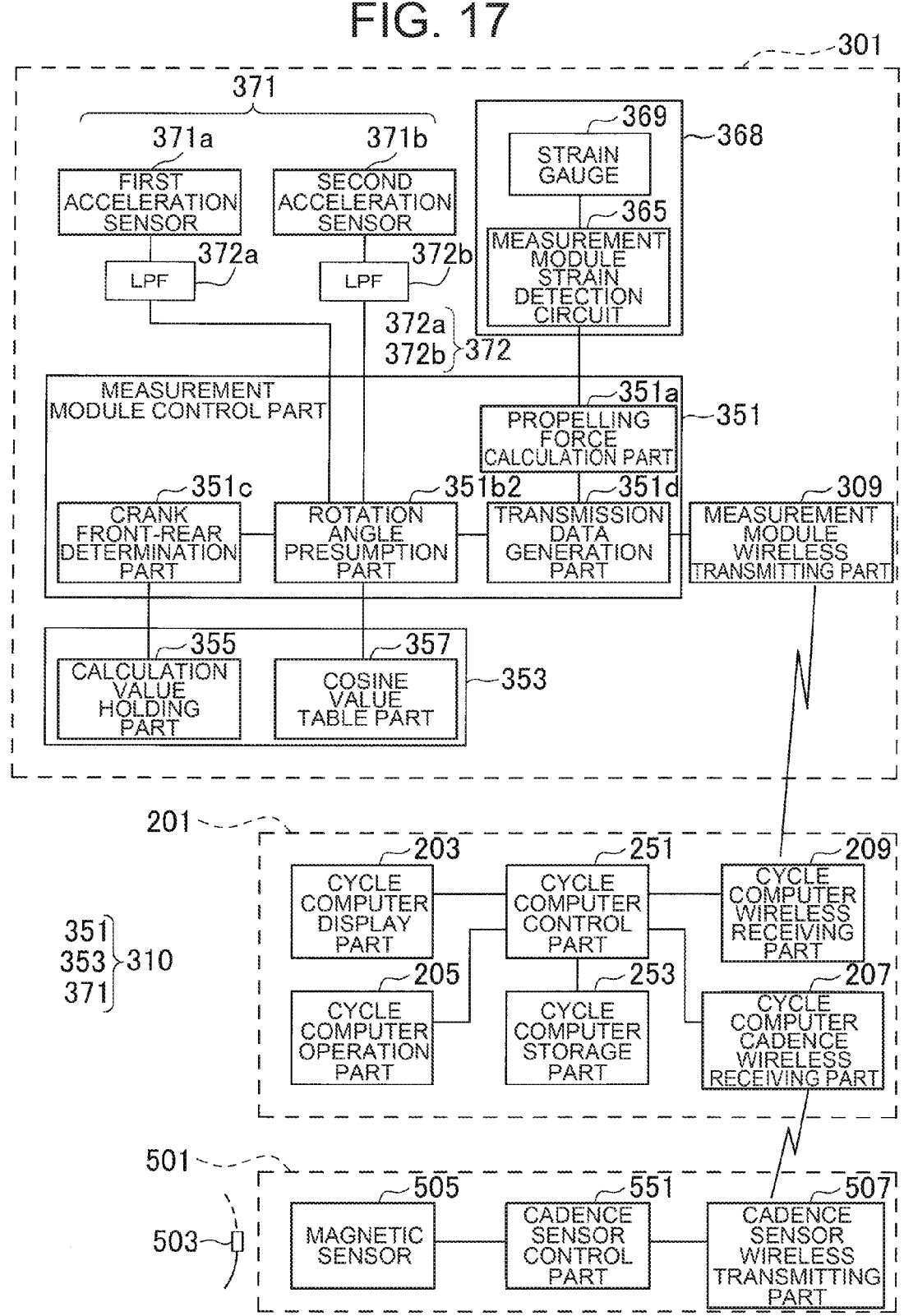
FIG. 17 illustrates a block configuration diagram of a cycle computer, a measurement module, and a cadence sensor according to a fourth embodiment of the present invention.
Figure 18:
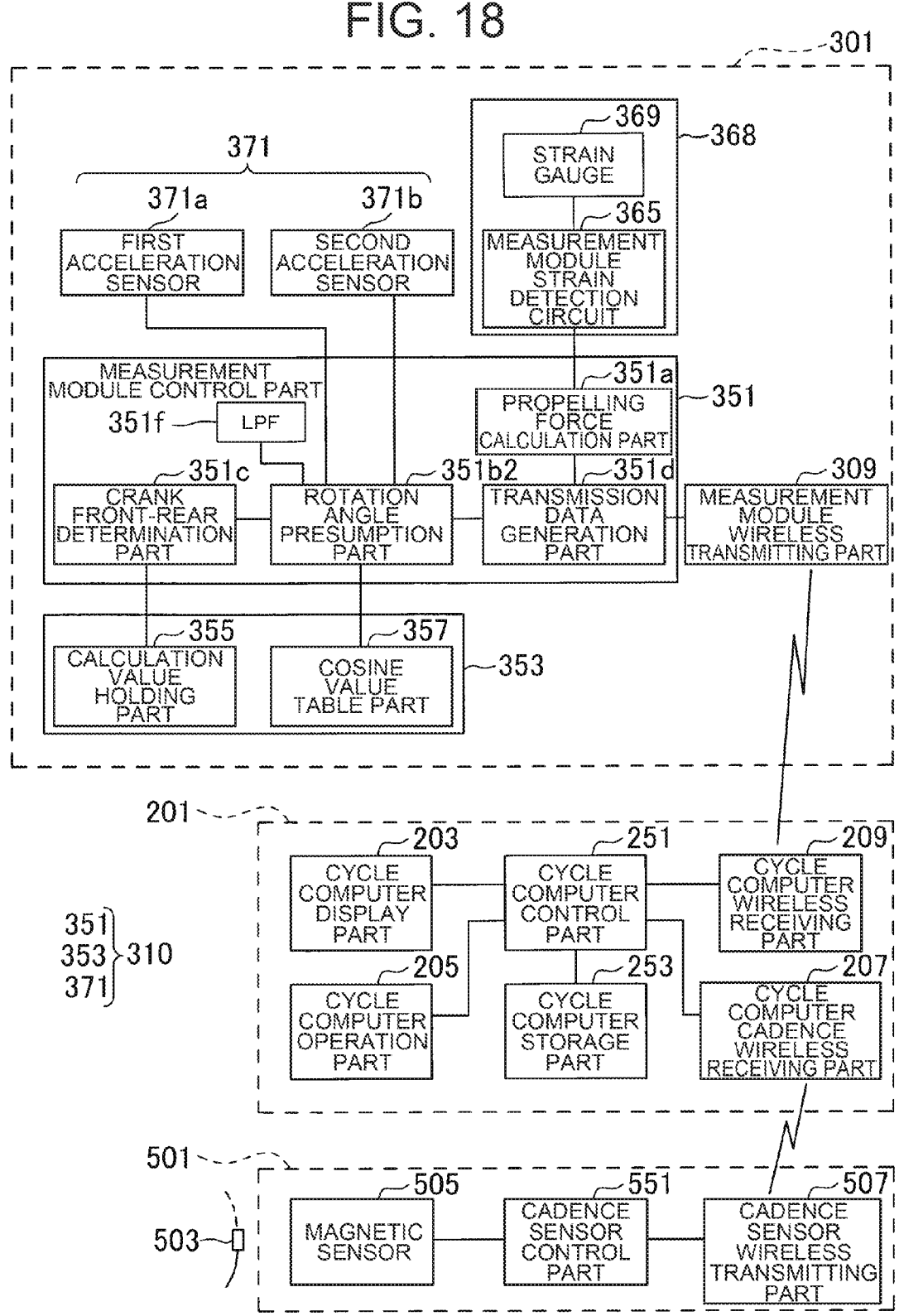
FIG. 18 illustrates a block configuration diagram of a cycle computer, a measurement module, and a cadence sensor according to another example of FIG. 17.

Next, a rotation angle detection device according to a fourth embodiment of the present invention is described with reference to FIG. 17 to FIG. 19. Further, the same numeral reference is assigned to the same part as the first embodiment described above, and the description thereof is therefore omitted.

In the present embodiment, output of an acceleration sensor 371 (see FIG. 17) or a value of calculated −cos θ or the like (see FIG. 18) is subjected to low pass filter (LPF) processing, and delay caused by the low pass filter processing is corrected by a rotation angle presumption part 351b2. Namely, a LPF 372 or a LPF 351f is served as a filter part.

Since various vibrations are applied to a vehicle such as a bicycle on which the rotation angle detection device is mounted, a component of acceleration other than a component of the gravitational acceleration or the acceleration of the centrifugal force may be often included in the output of the acceleration sensor 371. Accordingly, the output of the acceleration sensor 371 is subjected to a low pass filter processing by means of a digital filter such as a FIR (Finite Impulse Response) filter or an IIR (Infinite Impulse Response) filter in the LPF 372, and thereby a component of a noise such as vibration included in the output of the acceleration sensor 371 is eliminated. Alternatively, as shown in FIG. 18, −cos θ or the like calculated by the rotation angle presumption part 351b2 may be subjected to the low pass filter processing. Further, an analogue filter may be adopted instead of the digital filter.

Figure 19:
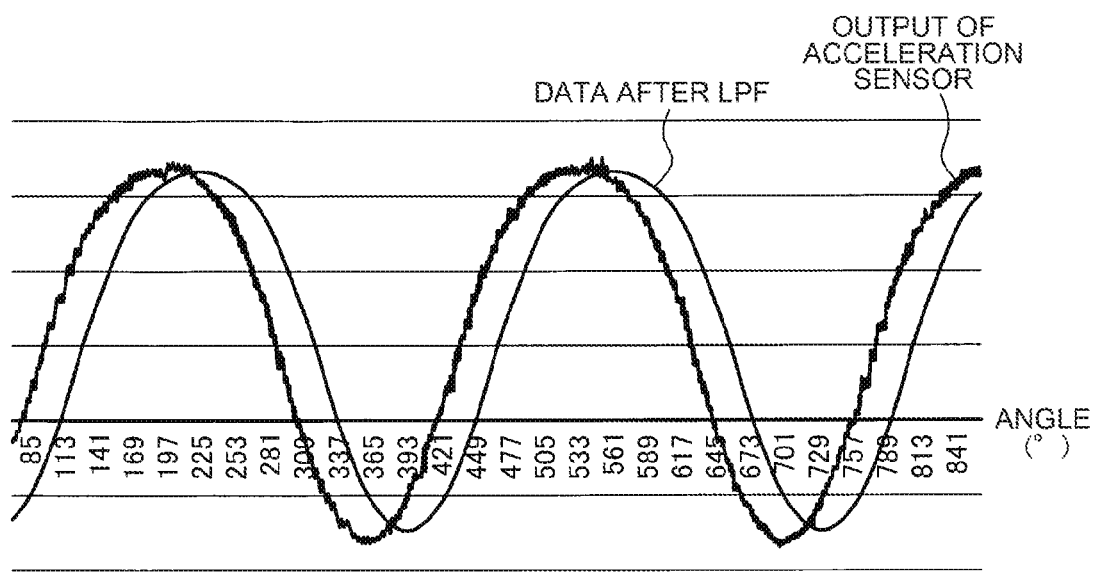
FIG. 19 is a graph illustrating output of an acceleration sensor before LPF shown in FIG. 17 is applied and after the LPF shown in FIG. 17 is applied.

As shown in FIG. 19, the output value or the cosine value (−cos θ or the like) subjected to the digital filter is to be delayed by certain samples due to the characteristics of the digital filter, and therefore the finally calculated rotation angle of the crank 105 is necessary to be corrected. Thus, in the rotation angle presumption part 351b2, the rotation angle is corrected by calculation as shown in a formula (19) described below. Namely, the rotation angle presumption part 351b2 is served as a delay angle correction part.

For example, as n tap FIR filter, sampling frequency fs (Hz), and the acceleration of the centrifugal force $a_{centrifugal\ force}$ (m/sec²) at a distance r (m) from the center of the crankshaft 107 are defined, the rotation angle of the crank 105 before n/(2×fs) (sec) is calculated.

Further, the acceleration of the centrifugal force $a_{centrifugal\ force}$ is represented by angular acceleration ω by using a formula (17), and the angular acceleration ω is represented by a formula (18).

[Formula 18]

$$\omega[\text{rad/sec}] = \sqrt{\frac{a_{centrifugal\ force}}{r}} \quad (18)$$

Accordingly, the calculated rotation angle is corrected to be advanced by an angle defined in a formula (19).

[Formula 19]

$$\frac{n}{2 \times fs} \sqrt{\frac{a_{centrifugal\ force}}{r}} \ [\text{rad}] \quad (19)$$

Further, the acceleration $a_{centrifugal\ force}$ of the centrifugal force can be calculated by using, for example, the second acceleration sensor 371b with the following formula (20) introduced by the formula (7)—the formula (6) described in the first embodiment. Alternatively, the acceleration $a_{centrifugal\ force}$ of the centrifugal force may be acquired from the first acceleration sensor 371a. In such a case, the acceleration $a_{centrifugal\ force}$ of the centrifugal force can be acquired by the formula (7)—the formula (6) in a similar way.

[Formula 20]

$$|\overrightarrow{a_{centrifugal\ force\ 2}}| = \frac{a2 - a1}{1 - r1/r2} \quad (20)$$

Alternatively, in the determination of that in which region the crank 105 is located among two regions in one rotation, rotation acceleration may be calculated by measuring a time of the half rotation, and the acceleration of the centrifugal force for correction may be acquired from the calculated rotation acceleration. Further, the acceleration of the centrifugal force calculated from the preceding time of the half rotation is used during the present half rotation.

According to the present embodiment, the LPF 372 which applies a filter processing to the first acceleration and the second acceleration, and the rotation angle presumption part 351b2 which executes an angle correction processing after the filter processing are arranged. With such a configuration, a component of acceleration other than the gravitational acceleration due to vibration or the acceleration of the centrifugal force applied to the crank 105 or the like can be eliminated, and accuracy of the information regarding the rotation angle of the crank 105 can be enhanced. Further, the delay caused by the filter processing can be corrected by the rotation angle presumption part 351b2.

Fifth Embodiment

Next, a rotation angle detection device according to a fifth embodiment of the present invention is described with reference to FIG. 20 and FIG. 21. Further, the same numeral reference is assigned to the same part as the first embodiment described above, and the description thereof is therefore omitted.

In the present embodiment, a member other than a crank 105, which is capable of detecting the rotation angle of the crank 105 by detecting acceleration in the longitudinal direction of the crank 105, is described.

Figure 20:
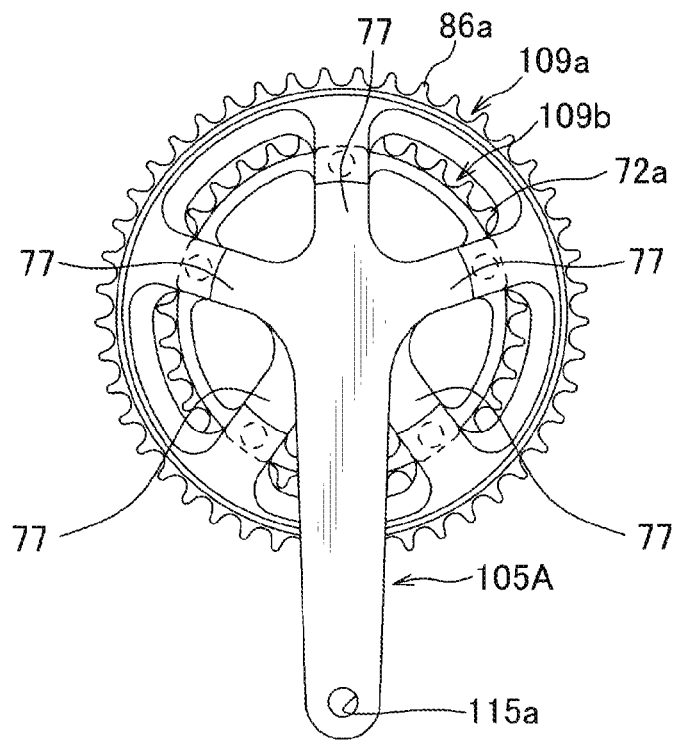
FIG. 20 is a plane view illustrating a chain ring and a crank according to a fifth embodiment of the present invention.

FIG. 20 is a plane view illustrating a chain ring 109 and a crank 105A according to the present embodiment. FIG. 21 is a plane view illustrating the crank 105A shown in FIG. 20.

The crank 105A is mounted to the chain ring 109 via a spider arm 77 described below. The chain ring 109 is provided with large and small sprockets (one example of a front chain wheel) 109a, 109b.

The crank 105A is provided with five spider arms 77 radially extended from a side of a crankshaft and on which the large and small sprockets 109a, 109b are mountable at a distal end thereof, and a crank arm 78 fixed on the crankshaft 107 and in which a pedal crankshaft mounting hole 115a is formed at a distal end thereof. The crank 105A is formed as an arm member having a plurality of arm parts radially extended from the crankshaft, and the crank 105A corresponds to a member rotated together with the crank. A sprocket mount part 77a is formed at the distal end of the spider arm 77. The sprocket mount part 77a is provided with a through hole 77b through which a fixing bolt is penetrated, and two mount surfaces 77c for mounting the sprockets 109a, 109b.

The sprocket 109a having a large diameter is provided with a circular gear member. The gear member is formed of, for example, aluminum alloy. A gear tooth 86a which engages with a chain 111 is formed on an outer peripheral part of the gear member. The sprocket 109b having a small diameter is provided with a circular gear member. The gear member is formed of, for example, aluminum alloy. A gear tooth 72a which engages with the chain 111 is formed on an outer peripheral part of the gear member.

Figure 21:
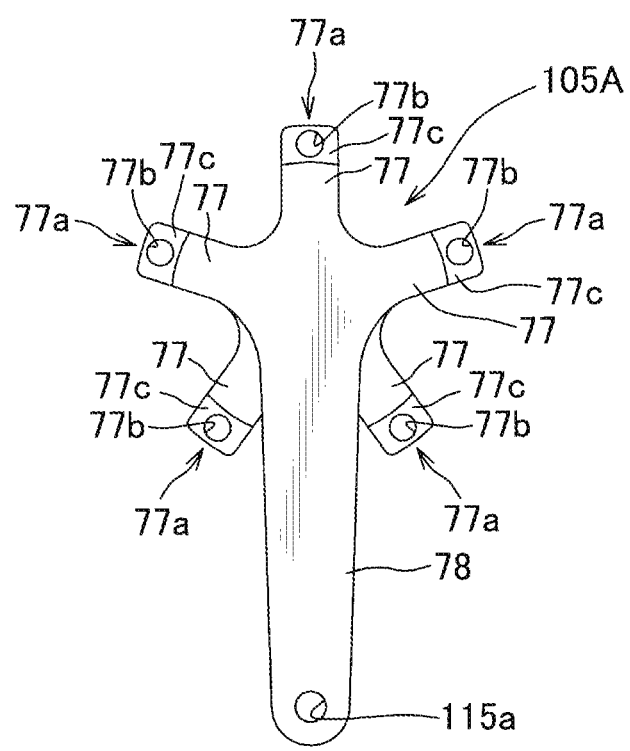
FIG. 21 is a plane view illustrating the crank shown in FIG. 20.

Further, in FIG. 20 and FIG. 21, the spider arm 77 is integrally formed with the crank arm 78, however it is not limited to this, and the spider arm 77 may be formed as another member from the crank arm 78.

In the crank 105A having such a structure, by arranging the acceleration sensors on the spider arm 77, the rotation angle of the crank arm 78 can be calculated similar to the first embodiment. One acceleration sensor may be arranged on the spider arm 77 and another acceleration sensor may be arranged on the crank arm 78, or alternatively two acceleration sensors may be arranged on the spider arm 77. However, as described in the first embodiment, in a case in which the detection axial directions of the two acceleration sensors are parallel to the longitudinal direction of the crank arm 78 and the two acceleration sensors are arranged on the same side of a right side or a left side, it is necessary that the two acceleration sensors are arranged so as to have different distances from the center of the crankshaft.

Further, the acceleration sensor may be arranged on not only the spider arm 77 but also on the pedal crankshaft 115 (pedal shaft). Namely, the acceleration sensor may be arranged on a crank mounted to a rotation shaft or a member rotated together with the crank capable of detecting the acceleration in the longitudinal direction of the crank. Here, a member rotated together with the crank means that the member is rotated coaxially with the crank at the same rotation speed as the crank.

According to the present embodiment, at least one acceleration sensor is arranged on the spider arm 77, and the information (−cos θ, −cos θ×K or the like) regarding the rotation angle of the crank arm 78 is calculated based on the output value of the acceleration sensor arranged on the spider arm 77, the output value of the acceleration sensor arranged on another spider arm 77 or the crank arm 78, and the distances of the two acceleration sensors from the center of the rotation of the crankshaft. With such a configuration, the rotation angle of the crank arm 78 can be calculated even though the acceleration sensor is arranged on the member other than the crank arm 78, and therefore degree of freedom of the arrangement of the acceleration sensor is enhanced.

Further, in the five embodiments described above, the propelling force, the loss force, or the rotation angle measured by the measurement module 301 is displayed on the cycle computer display part 203 of the cycle computer 201 in real time, however it is not limited to this. For example, the propelling force and the loss force may be output to a storage medium such as a memory card from the measurement module 301, and thereafter the propelling force and the loss force at each rotation angle of the crank 105 may be displayed in a time series manner after a personal computer or the like reads the information stored in the memory card.

Further, the machine driven by manpower in the present invention corresponds to a machine having the crank 105 (the crank arm 78) such as a bicycle 1, a fitness bike or the like. Namely, any types of the machine driven by manpower can be adopted as long as the machine has the crank 105 and the machine is driven by manpower (it is not necessarily to change a position of the machine).

Further, the measurement device in the present invention may be formed by a part of the cycle computer 201, or other independent device. Further, the measurement device may be formed of an assembly of a plurality of devices arranged so as to be physically separated. In this case, the measurement device may be formed of a device in which some components capable of connecting via communication, except the strain gauge 369 (the measurement module strain detection circuit 365) and the acceleration sensor 371, are arranged at different place from the machine.

Further, the present invention is not limited to the embodiments described above. Namely, a person skilled in the art can carry out the present invention by modifying the embodiments within the subject matter of the present invention in accordance with the conventional well-known knowledge. The modification of the present invention is also encompassed by the present invention as long as the modification has the rotation angle detection device according to the present invention.

REFERENCE SIGNS LIST

1 bicycle
77 spider arm (a member rotated together with crank)
105 crank
107 crankshaft (rotation shaft)
310 rotation angle detection device
351 measurement module control part
351*b* rotation angle presumption part (output part, delay angle correction part)
351*c* crank front-rear determination part (crank position detection part)
351*e* flag (holding part)
351*f* LPF (filter part)
353 measurement module storage part
355 cosine value holding part (cosine value storing part)
357 cosine table part (table part)
371*a* first acceleration sensor
371*b* second acceleration sensor
371*c* third acceleration sensor
372 LPF (filter part)
a1 acceleration detected by the first acceleration sensor (first acceleration)
a2 acceleration detected by the second acceleration sensor (second acceleration)
r1 distance between the first acceleration sensor and the center of the crankshaft (first distance)
r2 distance between the second acceleration sensor and the center of the crankshaft (second distance)
ST11 rotation angle detection (first acceleration detection step, second acceleration detection step, output step)

The invention claimed is:

1. A rotation angle detection device comprising:
a first acceleration sensor which is arranged on a crank or a member rotated together with the crank so as to be located at a position away from the rotation shaft of the crank by a first distance, the first acceleration sensor configured to detect first acceleration in a direction parallel to a longitudinal direction of the crank;
a second acceleration sensor which is arranged on the crank or a member rotated together with the crank so as to be located at a position away from the rotation shaft of the crank by a second distance being different from the first distance, the second acceleration sensor configured to detect second acceleration in a direction parallel to the longitudinal direction of the crank; and
an output part which outputs information regarding a rotation angle of the crank based on the first acceleration, the second acceleration, the first distance, and the second distance.

2. The rotation angle detection device according to claim 1, wherein the output part is configured to calculate a cosine value based on differences between a value by multiplying the second distance by the first acceleration and a value by multiplying the first distance by the second acceleration and to output the information regarding the rotation angle of the crank based on the cosine value.

3. A rotation angle detection device comprising:
a first acceleration sensor which is arranged on a crank mounted to a rotation shaft or a member rotated together with the crank so as to be located at a position away from the rotation shaft of the crank by a first distance, the first acceleration sensor configured to detect first acceleration in a direction parallel to a longitudinal direction of the crank;
a second acceleration sensor which is arranged on the crank or a member rotated together with the crank so as to be located at a position away from the rotation shaft of the crank by a second distance being different from the first distance, the second acceleration sensor configured to detect second acceleration in a direction parallel to the longitudinal direction of the crank;
an output part which outputs information regarding a rotation angle of the crank based on the first acceleration, the second acceleration, the first distance, and the second distance; and
a table part in which a correspondence relation between a predetermined rotation angle and the cosine value is defined in advance,
wherein the output part is configured to calculate a cosine value based on differences between a value by multiplying the second distance by the first acceleration and a value by multiplying the first distance by the second acceleration and to output the information regarding the rotation angle of the crank based on the cosine value, and to output the information regarding the rotation angle of the crank based on the calculated cosine value and the table part.

4. A rotation angle detection device comprising:
a first acceleration sensor which is arranged on a crank mounted to a rotation shaft or a member rotated together with the crank so as to be located at a position away from the rotation shaft of the crank by a first distance, the first acceleration sensor configured to detect first acceleration in a direction parallel to a longitudinal direction of the crank;
a second acceleration sensor which is arranged on the crank or a member rotated together with the crank so as to be located at a position away from the rotation shaft of the crank by a second distance being different from the first distance, the second acceleration sensor configured to detect second acceleration in a direction parallel to the longitudinal direction of the crank;
an output part which outputs information regarding a rotation angle of the crank based on the first acceleration, the second acceleration, the first distance, and the second distance; and
a crank position detection part which detects a position of the crank that in which region the crank is located among two regions of half rotation parts into which one rotation of the crank is equally divided in a vertical direction, wherein the output part is configured to calculate a cosine value based on differences between a value by multiplying the second distance by the first acceleration and a value by multiplying the first distance by the second acceleration and to output the information regarding the rotation angle of the crank based on the cosine value, and to output the information regarding the rotation angle of the crank based on a detection result of the crank position detection part and the cosine value.

5. The rotation angle detection device according to claim 4, further comprising a cosine value storing part which stores more than one cosine value calculated in the past, wherein the crank position detection part is configured to detect the position of the crank that in which region the crank is located among the two regions of the half rotation parts into which one rotation of the crank is equally divided in the vertical direction based on the cosine value stored in the cosine value storing part and a cosine value calculated at this time.

6. The rotation angle detection device according to claim 4, further comprising a holding part which holds information of two values mutually changed in accordance with that in which region the crank is located among the two regions of the half rotation parts into which one rotation of the crank is equally divided in the vertical direction, wherein the crank position detection part is configured to change the information held in the holding part based on the cosine value.

7. The rotation angle detection device according to claim 4, further comprising a third acceleration sensor which detects third acceleration in a direction parallel to a short direction of the crank, wherein the crank position detection part is configured to detect the position of the crank that in which region the crank is located among two regions of the half rotation parts into which one rotation of the crank is equally divided in the vertical direction based on the third acceleration.

8. The rotation angle detection device according to claim 4, further comprising a filter part which executes filter processing to one of the first acceleration and the second acceleration and the cosine value, and a delay angle correction part which executes angle correction processing after the filter processing is executed.

* * * * *